(12) United States Patent
Kramer et al.

(10) Patent No.: US 8,585,784 B2
(45) Date of Patent: Nov. 19, 2013

(54) SHADING PROCESS

(75) Inventors: Hans Kramer, Frick (CH); Frank Bachmann, Freiburg (DE); Christof Dosenbach, Bad Bellingen (DE); Mini Jeevanath, Bangalore (IN); Georg Roentgen, Freiburg (DE); Adolf Käser, Bottmingen (CH); Roger Wolfgang Basler, Grenzach-Wyhlen (DE)

(73) Assignee: BASF SE, Ludwigshafen (DE)

( * ) Notice: Subject to any disclaimer, the term of this patent is extended or adjusted under 35 U.S.C. 154(b) by 230 days.

(21) Appl. No.: 12/743,849

(22) PCT Filed: Nov. 25, 2008

(86) PCT No.: PCT/EP2008/066114
§ 371 (c)(1),
(2), (4) Date: Sep. 1, 2010

(87) PCT Pub. No.: WO2009/068513
PCT Pub. Date: Jun. 4, 2009

(65) Prior Publication Data
US 2010/0319142 A1    Dec. 23, 2010

(30) Foreign Application Priority Data
Nov. 26, 2007 (EP) .................... 07121479

(51) Int. Cl.
*D06P 1/26* (2006.01)
*C09B 56/14* (2006.01)
*C09B 62/008* (2006.01)
*C09B 47/04* (2006.01)

(52) U.S. Cl.
USPC ............... 8/661; 534/702; 534/591; 534/588; 534/842; 534/841; 534/803; 534/797

(58) Field of Classification Search
USPC ............................................................ 8/661
See application file for complete search history.

(56) References Cited

U.S. PATENT DOCUMENTS

| | | | |
|---|---|---|---|
| 4,504,272 A | 3/1985 | Ong | |
| 5,760,215 A | 6/1998 | Gisler | |
| 6,726,755 B2 * | 4/2004 | Titterington et al. | 106/31.29 |
| 6,946,549 B2 * | 9/2005 | Ebenezer | 534/634 |
| 2009/0105108 A1 | 4/2009 | Hohener | |

FOREIGN PATENT DOCUMENTS

| | | |
|---|---|---|
| DE | 196 22 180 A1 | 12/1996 |
| EP | 0001451 A1 * | 9/1978 |
| EP | 0 712 906 A | 5/1996 |
| GB | 916 532 A | 1/1963 |
| GB | 949 502 A | 2/1964 |
| GB | 1 405 132 A | 9/1975 |
| GB | 2 200 364 A | 8/1988 |
| JP | 61087759 A * | 5/1986 |
| WO | 02/092697 A | 11/2002 |
| WO | 2004/035691 A | 4/2004 |
| WO | 2005/014769 A | 2/2005 |
| WO | 2006/024612 A | 3/2006 |
| WO | WO 2006024612 A1 * | 3/2006 |

OTHER PUBLICATIONS

JPO abstract of JP-6187759, published on May 6, 1986, English text accessed in the JPO.*
Derwent abstract of JP-6187759, Derwent Acc-No. 1986-153459.*
English translation of Yamamura et al., JP 61-087759, completed by the STIC Translations Service Center on Jul. 22, 2013, attached as a PDF.*
English Language Abstract of WO 2004/035691 Printed on Aug. 31, 2010.

* cited by examiner

*Primary Examiner* — Harold Pyon
*Assistant Examiner* — Katie L Hammer
(74) *Attorney, Agent, or Firm* — Shiela A. Loggins

(57) ABSTRACT

The present invention relates to new compounds, which are molecular combinations of a phthalocyanine and a mono-azo dyestuff linked via specific linking groups and to a process for their preparation. Further aspects are shading compositions using these compounds.

9 Claims, No Drawings

SHADING PROCESS

The present invention relates to new compounds, which are molecular combinations of a phthalocyanine and a mono-azo dyestuff linked via specific linking groups and to a process for their preparation. Further aspects are an improved shading process for textile materials and also shading compositions using these compounds.

A frequently employed method in bleaching and whitening is to use violet or blue dyes concurrently in order to improve the bleaching and whitening effect. If such a dye is used in conjunction with a fluorescent whitening agent, this can serve two different purposes. On one hand, it is possible to achieve an increase in the degree of whiteness by compensating for the yellowness of the fabric, in which case the white shade produced by the fluorescent whitening agent on the fabric is largely retained. On the other hand, the object can be to effect with the dye in question a change in the shade of the white effect produced by the fluorescent whitening agent on the fabric. It is thus possible to adjust the desired shade of the white effect.

Shading processes of materials such as paper and textile fabrics are known from e.g. DE 3125495.

These disclosed shading processes use a physical mixture of a photocatalyst and a dyestuff, which are not suitable for a regular use in detergent or softener formulations, because the dyestuffs accumulate with every use and after a few uses the fabrics are colored.

Additionally, the use of a mixture of two components always requires the proper ratio of the two components.

To overcome the problem of accumulation WO 2006/024612 suggests a molecular combination of a photocatalyst and a dyestuff. A wide variety of photocatalysts and classes of dyestuffs are disclosed. The specific combinations disclosed in WO 2006/024612, however, have still the disadvantage that a significant accumulation occurs and the dye conjugate is not photo degraded rapidly enough.

Surprisingly it has now been found that when the phthalo-cyanine is a sulfonated phthalo-cyanine and the dyestuff bonded thereto is a mono-azo dyestuff linked via a specific linking group, photo degradation becomes rapid enough so that no color formation on the treated fabric occurs, even after repeated treatment. The improved shading process using these compounds has also an improved exhaustion onto the fabrics. The new compounds are also highly efficient photo-catalysts by additional light absorption and energy transfer to the phthalocyanine part of the molecule.

One aspect of the invention is a Zn—, Ca—, Mg—, Na—, K—, Al, Si—, Ti—, Ge—, Ga—, Zr—, In— or Sn—phtha-locyanine compound of formula (1) (PC)-L-(D) (1) to which at least one mono-azo dyestuff is attached through a covalent bonding via a linking group L wherein PC is the metal-containing phthalocyanine ring system;
D is the radical of a mono-azo dyestuff; and
L is a group

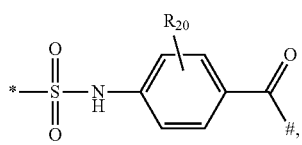

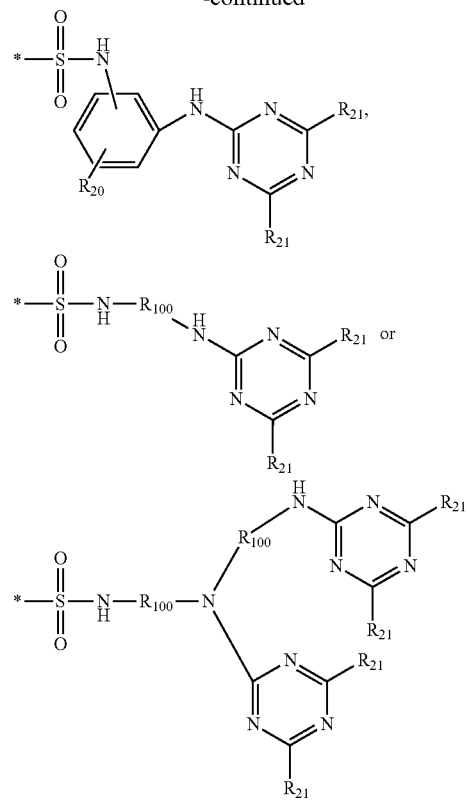

wherein
$R_{20}$ is hydrogen, $C_1$-$C_8$alkyl, $C_1$-$C_8$alkoxy or halogen;
$R_{21}$ is independently D, hydrogen, OH, Cl or F, with the proviso that at least one is D;
$R_{100}$ is $C_1$-$C_8$alkylene
\* is the point of attachment of PC;
\# is the point of attachment of the dye.

In a specific embodiment the invention is a Zn—, Ca—, Mg—, Na—, K—, Al, Si—, Ti—, Ge—, Ga—, Zr—, In— or Sn— phthalocyanine compound of formula (1) (PC)-L-(D) (1) to which at least one mono-azo dyestuff is attached through a covalent bonding via a linking group L wherein
PC is the metal-containing phthalocyanine ring system;
D is the radical of a mono-azo dyestuff; and
L is a group

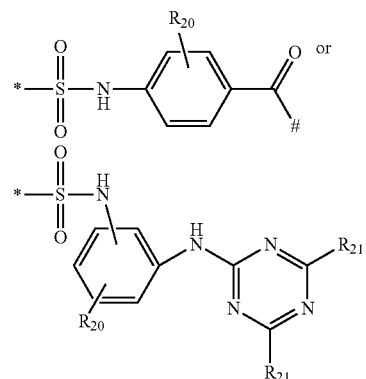

wherein
R$_{20}$ is hydrogen, C$_1$-C$_8$alkyl, C$_1$-C$_8$alkoxy or halogen;
R$_{21}$ is independently D, hydrogen, OH, Cl or F, with the proviso that at least one is D;
* is the point of attachment of PC;
# is the point of attachment of the dye.
C$_1$-C$_8$alkyl is linear or branched alkyl, for example methyl, ethyl, propyl, butyl, pentyl, hexyl, heptyl, octyl or isopropyl.
C$_1$-C$_8$alkoxy is linear or branched, for example methoxy, propoxy or octoxy.
Halogen is F, Cl, Br or I, preferably Cl.
C$_1$-C$_8$alkylene is, for example, linear or branched methylene, ethylene, propylene, butylene or pentylene.
For example the compound of formula 1 is of formula (1a)

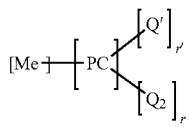
(1a)

in which
PC is the metal-containing phthalocyanine ring system,
Me is Zn; Ca; Mg; Na; K; Al—Z$_1$; Si(IV)-(Z$_1$)$_2$; Ti(IV)-(Z$_1$)$_2$; Ge(IV)-(Z$_1$)$_2$; Ga(III)-Z$_1$; Zr(IV)-(Z$_1$)$_2$; In(III)-Z$_1$ or Sn(IV)-(Z$_1$)$_2$
Z$_1$ is an alkanolate ion; a hydroxyl ion; R$_0$COO$^-$; ClO$_4^-$; BF$_4^-$; PF$_6^-$; R$_0$SO$_3$; SO$_4^{2-}$; NO$_3^-$;
F$^-$; Cl$^-$; Br$^-$; I$^-$; citrate ion; tartrate ion or oxalate ion, wherein R$_0$ is hydrogen; or unsubstituted C$_1$-C$_{18}$alkyl;
r is 0; 1; 2; 3 or 4;
r' is 1; 2; 3 or 4;
each Q$_2$ is independently of each other —SO$_3^-$M$^+$ or a group —(CH$_2$)$_m$—COO$^-$M$^+$; wherein M$^+$ is H$^+$, an alkali metal ion or the ammonium ion and m is 0 or a number from 1 to 12;
each Q' is independently from each other a moiety of formula -L-D wherein
D is the radical of a mono-azo dyestuff; and
L is a group

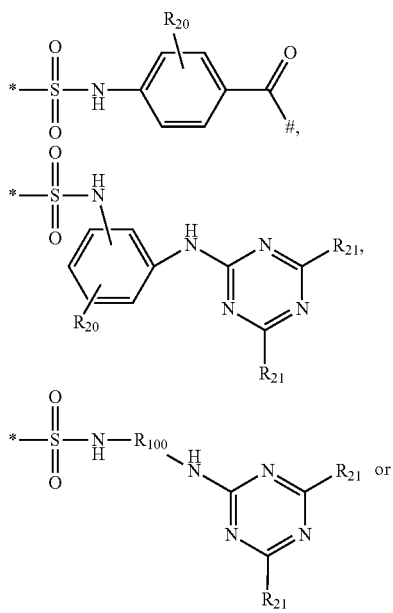

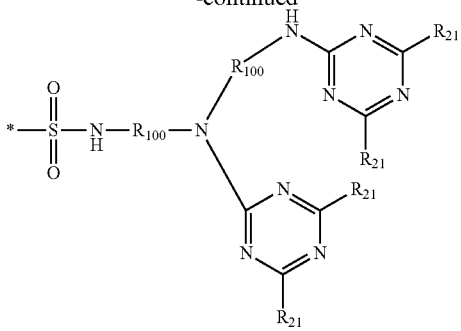

wherein
R$_{20}$ is hydrogen, C$_1$-C$_8$alkyl, C$_1$-C$_8$alkoxy or halogen;
R$_{21}$ is independently D, hydrogen, OH, Cl or F, with the proviso that at least one is D;
R$_{100}$ is C$_1$-C$_8$alkylene
* is the point of attachment of PC, # is the point of attachment to D.
Preferably L is a group

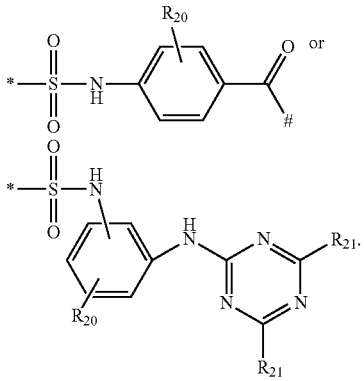

Preferably, the sum of r and r' is from 2 to 6, more preferably the sum is from 2 to 4.
Preferably, Me is Zn, AlZ$_1$, Si(IV)-(Z$_1$)$_2$ or Ti(IV)-(Z$_1$)$_2$, wherein Z$_1$ has the meanings as defined above.
More preferably, Me is Zn, AlZ$_1$, Si(IV)-(Z$_1$)$_2$ or Ti(IV)-(Z$_1$)$_2$, wherein Z$_1$ is chlorine, fluorine, bromine or hydroxyl. Particular preference is given to Zn.
In a preferred embodiment of the invention the compound of formula (1) is of formula (2a)

(2a)

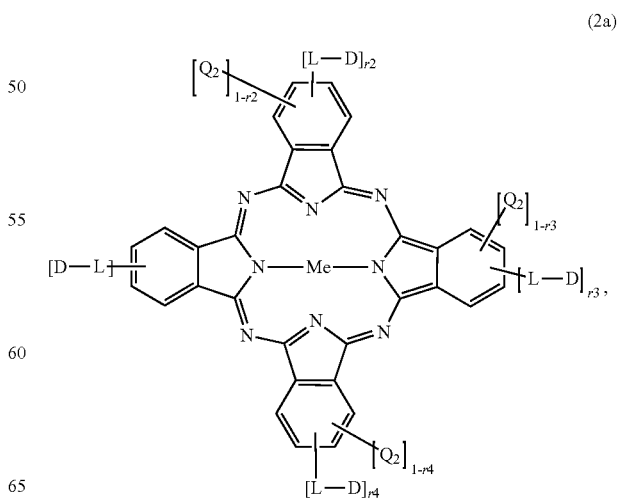

wherein

Me is Zn, AlZ$_1$, Si(IV)-(Z$_1$)$_2$ or Ti(IV)-(Z$_1$)$_2$, wherein Z$_1$ is chloride, fluorine, bromine or hydroxyl;

each Q$_2$ is independently from each other —SO$_3^-$M$^+$ or a group —(CH$_2$)$_m$—COO$^-$M$^+$; wherein M$^+$ is H$^+$, an alkali metal ion or the ammonium ion and m is 0 or a number from 1 to 12;

D is the radical of a dyestuff;

L is a group

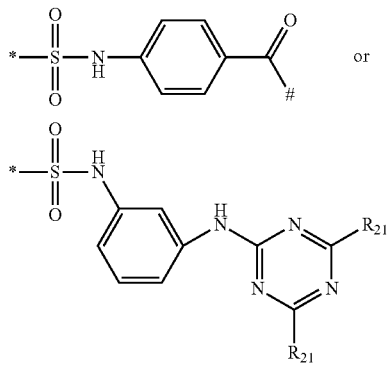

wherein

R$_{21}$ is independently D, hydrogen, OH, Cl or F with the proviso that at least one is D;

* is the point of attachment of PC, # is the point of attachment to D;

r$_2$ is 0 or 1, r$_3$ is 0 or 1, and r$_4$ is 0 or 1.

For example each D is independently from each other a dyestuff radical of formulae Xa, Xb, Xc or Xd

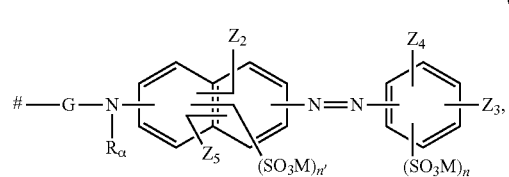

(Xa)

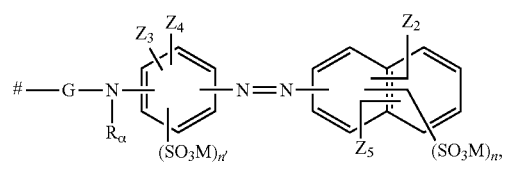

(Xb)

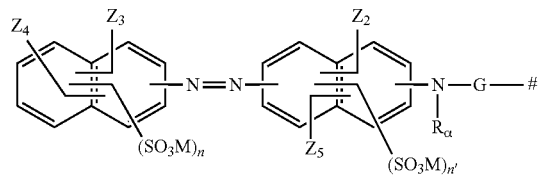

(Xc)

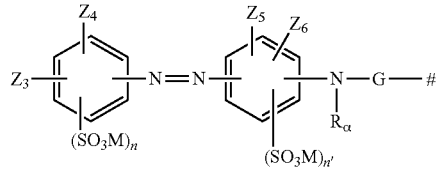

(Xd)

wherein marks the bond to the bridging group L,

R$_\alpha$ is hydrogen; linear or branched, unsubstituted C$_1$-C$_4$-alkyl; linear or branched C$_1$-C$_4$-alkyl, which is substituted by at least one substituent chosen from the group consisting of hydroxyl, cyano, SO$_3$H, —NH$_2$, carboxyl, carb-C$_1$-C$_4$alkoxy, C$_1$-C$_4$alkoxy, phenyl, naphthyl and pyridyl; unsubstituted aryl or aryl, which is substituted by at least one substituent chosen from the group consisting of hydroxyl, cyano, SO$_3$H, —NH$_2$, carboxyl, carb-C$_1$-C$_4$alkoxy, C$_1$-C$_4$alkoxy and C$_1$-C$_4$alkyl, Z$_2$, Z$_3$, Z$_4$, Z$_5$ and Z$_6$ are independently from each other hydrogen; linear or branched, unsubstituted C$_1$-C$_4$-alkyl; linear or branched C$_1$-C$_4$-alkyl, which is substituted by at least one substituent chosen from the group consisting of hydroxyl, cyano, SO$_3$H, —NH$_2$, carboxyl, carb-C$_1$-C$_4$alkoxy, C$_1$-C$_4$alkoxy, phenyl, naphthyl and pyridyl; linear or branched, unsubstituted C$_1$-C$_4$-alkoxy or linear or branched, C$_1$-C$_4$-alkoxy, which is substituted by at least one substituent chosen from the group consisting of hydroxyl, cyano, SO$_3$H, —NH$_2$, carboxyl, carb-C$_1$-C$_4$alkoxy, C$_1$-C$_4$alkyl, phenyl, naphthyl and pyridyl; halogen; OH; SO$_2$CH$_2$CH$_2$SO$_3$H; NO$_2$; COOH; COOC$_1$-C$_4$alkyl; NH$_2$; NHC$_1$-C$_4$alkyl, wherein the alkyl group may be substituted by at least one substituent chosen from the group consisting of OH, NH$_2$, C$_1$-C$_4$alkyl, CN or COOH; N(C$_1$-C$_4$alkyl)C$_1$-C$_4$alkyl, wherein the alkyl groups may independently of each other be substituted by at least one substituent chosen from the group consisting of OH, NH$_2$, C$_1$-C$_4$alkyl, CN and COOH; NH-aryl; NH-aryl, wherein the aryl is substituted by at least one substituent chosen from the group consisting of hydroxyl, cyano, SO$_3$H, —NH$_2$, carboxyl, carb-C$_1$-C$_4$alkoxy, C$_1$-C$_4$alkyl and C$_1$-C$_4$alkoxy; NHCOC$_1$-C$_4$alkyl or NHCOOC$_1$-C$_4$alkyl, G is a direct bond; COOC$_1$-C$_4$alkylene; unsubstituted arylene; arylene which is substituted by at least one substituent chosen from the group consisting of hydroxyl, cyano, NO$_2$, SO$_3$H, —NH$_2$, carboxyl, carb-C$_1$-C$_4$alkoxy, C$_1$-C$_4$alkoxy and C$_1$-C$_4$alkyl; unsubstituted C$_1$-C$_4$alkylene or C$_1$-C$_4$-alkylene which is substituted by at least one substituent chosen from the group consisting of hydroxyl, cyano, NO$_2$, SO$_3$H, —NH$_2$, carboxyl, carb-C$_1$-C$_4$alkoxy, C$_1$-C$_4$alkoxy and C$_1$-C$_4$alkyl; or —CO-arylene, n is 0; 1; 2 or 3, n' is 0; 1 or 2, each M is independently from each other hydrogen; an alkali metal ion or an ammonium ion.

The substituents in the naphthyl groups, when not attached to an individual carbon atom can be attached in either ring of the naphthyl radical. This is expressed by the horizontal line going through both rings in, for example, in structural formula Xa, Xb and Xc.

For example C$_1$-C$_4$alkylene is methylene, ethylene, propylene or butylene.

Arylene in the context of the instant invention means phenylene or naphthylene, preferably phenylene.

Preferably each D is independently from each other a dyestuff radical of formulae XIa, XIb, XIc or XId (XIa)

—G—NH—[ring with $Z_2$, $Z_5$, $(SO_3M)_{n'}$]—N=N—[ring with $Z_4$, $(SO_3M)_n$]—$Z_3$, wherein
marks the bond to the bridging group L,
$Z_2$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl or OH,
$Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl,
$Z_4$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl,
$Z_5$ is hydrogen; linear or branched, unsubstituted $C_1$-$C_2$-alkyl or linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl,
G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $O_1$—$C_2$alkoxy and $C_1$-$C_2$alkyl, n is 0, 1, 2 or 3,
n' is 0, 1 or 2,
each M is independently from each other hydrogen; $Na^+$ or $K^+$;

(XIb)

—G—NH—[ring with $Z_3$, $(SO_3M)_{n'}$]—N=N—[ring with $Z_2$, $Z_5$, $(SO_3M)_n$], wherein
marks the bond to the bridging group L,
$Z_2$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl or OH,
$Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl,
$Z_5$ is hydrogen; linear or branched, unsubstituted $C_1$-$C_2$-alkyl or linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl,
G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl,
n is 0, 1; 2 or 3,
n' is 0, 1 or 2,
each M is independently from each other hydrogen; $Na^+$ or $K^+$;

(XIc)

[ring with $Z_4$, $Z_3$, $(SO_3M)_n$]—N=N—[ring with $Z_2$, $Z_5$, $(SO_3M)_{n'}$]—NH—G—#, wherein \# marks the bond to the bridging group L, $Z_2$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl, $Z_4$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl, $Z_5$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $O_1$—$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $O_1$—$C_2$alkoxy and $C_1$-$C_2$alkyl, n is 0, 1; 2 or 3, n' is 0, 1 or 2, each M is independently from each other hydrogen; $Na^+$ or $K^+$;

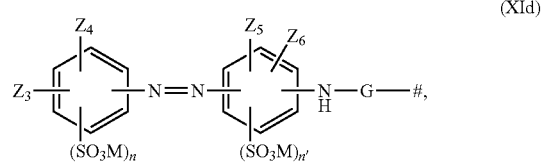

(XId)

wherein

\# marks the bond to the bridging group L, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $SO_2CH_2CH_2SO_3H$; or $NO_2$, $Z_4$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $SO_2CH_2CH_2SO_3H$; or $NO_2$, $Z_5$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$—$C_2$alkyl or $NHCOOC_1$—$C_2$alkyl, $Z_6$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; or $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, $—NH_2$, carboxyl, carb-$C_1$-$C_2$alkoxy, $C_1$-$C_2$alkoxy and $C_1$-$C_2$alkyl, n is 0, 1; 2 or 3, n' is 0, 1 or 2, each M is independently from each other hydrogen; Na$^+$ or K.

Particularly preferred phthalocyanine compounds have the formula (3a),

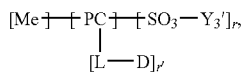
(3a)

in which

PC, L and D are as defined above (including the preferences),

Me is Zn or Al—$Z_1$, $Z_1$ is chlorine, fluorine, bromine or hydroxyl;

$Y_3'$ is hydrogen; an alkali metal ion or ammonium ion, and r is any number from 0 to 4, preferably any number from 1 to 4, r' is any number from 1 to 4.

Particularly suitable individual dyestuff radicals D are of formulae 10, 11, 12, 13 or 14

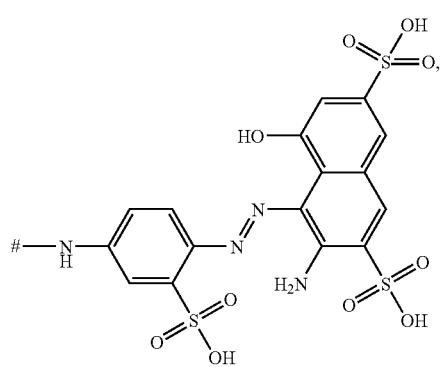

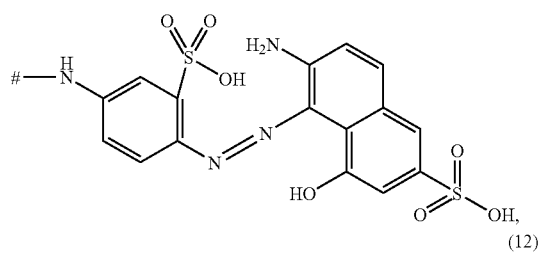

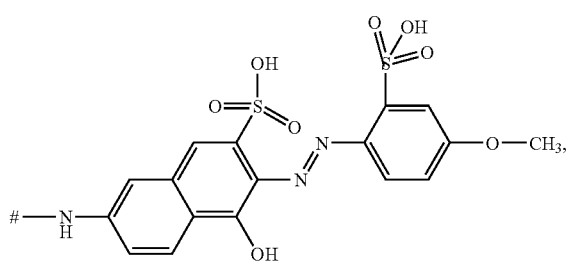

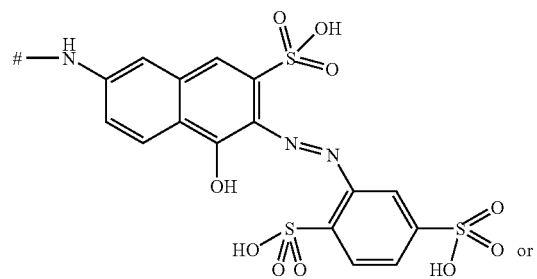
(13)

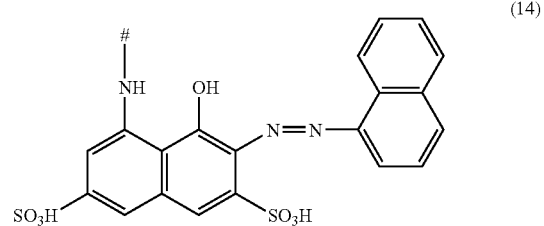
(14)

wherein # marks the bond to the bridging group L.

The sulfonic acid groups of the dyes represented by —$SO_3H$ may also be in the form of their salts, in particular of alkali metal salts, such as Na, K or Li salts or as ammonium salts. Also mixtures of the free acid and the corresponding salts are embraced.

A particularly suitable individual phthalocyanine is represented by the following formula wherein the degree of sulfonation is between 2 and 3 in the phthalocyanine ring.

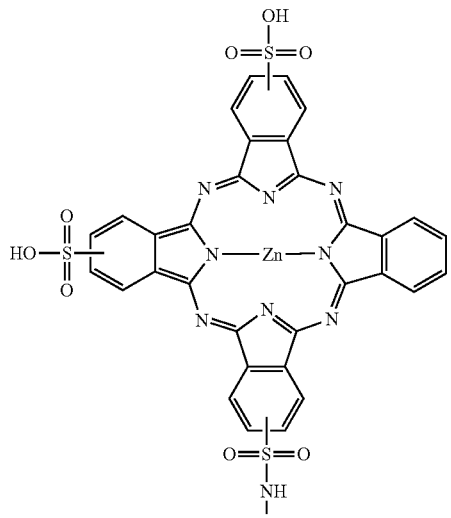

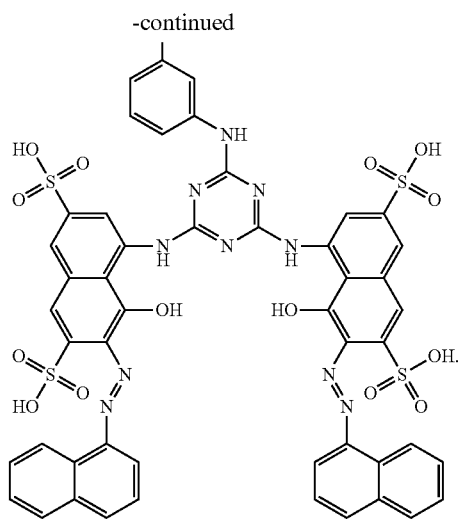

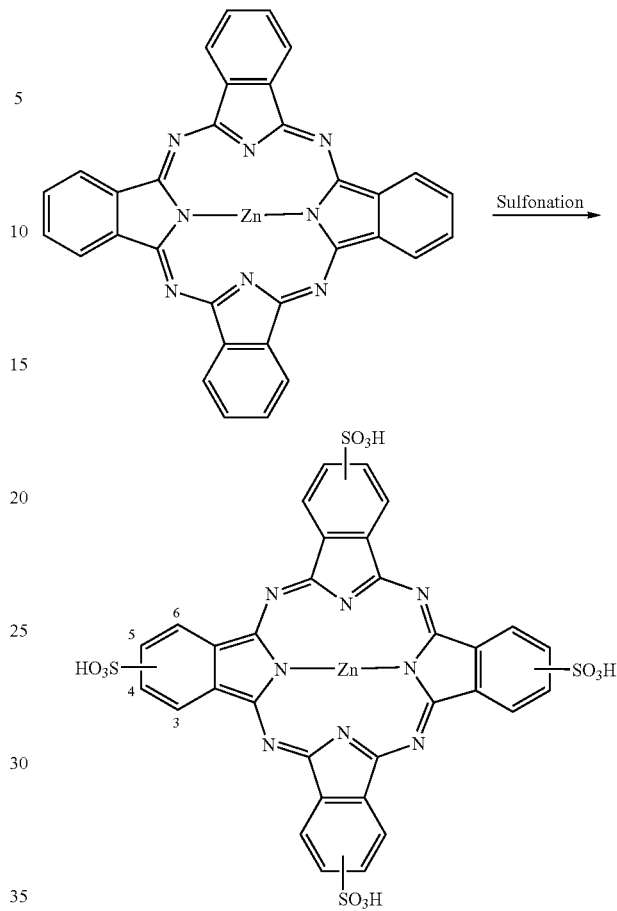

Depending on the pH value of the medium the sulfonic acid groups of the phthalocynine ring as well as of the dyestuff groups may be more or less dissociated.

A further embodiment of the present invention relates to a process for producing compounds of formula (Ia)

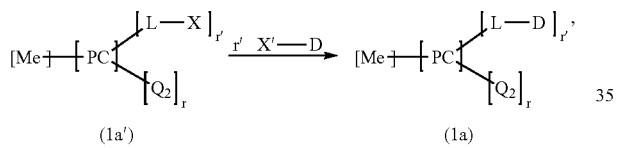

wherein X and X' is a leaving group and
all other substituents have the meaning as defined above, including all preferences and definitions.

For the synthesis of metal phthalocyanines, two different pathways may be followed: either the initial synthesis of a metal-free phthalocyanine derivative and subsequent complexation with a metal salt or the synthesis of a phthalocyanine ring system from a simple benzenoid precursor by concomitant incorporation of the metal ion.

Substituents can be introduced before or after the formation of the phthalocyanine ring system. In the former case, this leads to derivatives with substituents in all four rings, whereas in the latter case the degree of substitution will be variable.

By an introduction of suitable substituents, water-soluble phthalocyanines can be obtained after known procedures (DE1569783, DE1569729, DE2021257, DE1794298). The synthesis and use of such metal phthalocyanines for the use as photoactivators are also known (DE0081462 and references cited therein).

A suitable method to obtain water-soluble phthalocyanine is the introduction of sulfonate groups.

The introduction can be done, for example, by sulfonation of the unsubstituted metal phthalocyanine.

Generally, the sulfonated phthalocyanines are not pure substances, but complex mixtures of different positional isomers. The $SO_3H$-group can be located at position 3, 4, 5 or 6. Also the degree of sulfonation is varying and normally not whole-numbered. For example, a tetra sodium salt of the Zinc phthalocyanine can be prepared after known procedure [J. Griffiths et al., Dyes and Pigments, Vol 33, 65-78 (1997) and literature cited therein].

Another method to obtain a sulfonated metal phthalocyanine is reacting a sulfophthalic acid with a metal salt, urea and a molybdate catalyst in a melt condensation. The obtained phthalocyanine is also a mixture of isomers, but in this case only position isomers are found.

The position of the sulfonation is determined by the corresponding phthalic acid. If 4-sulfophthalic acid is used, a tetrasulfonated metal phthalocyanine with sulfonic acid groups exclusively in position 4 or 5 is obtained.

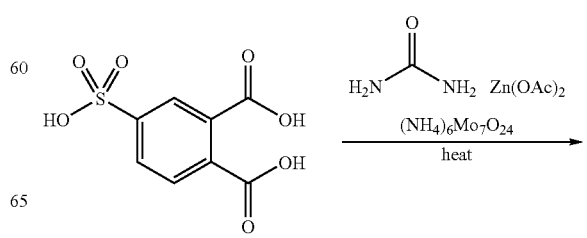

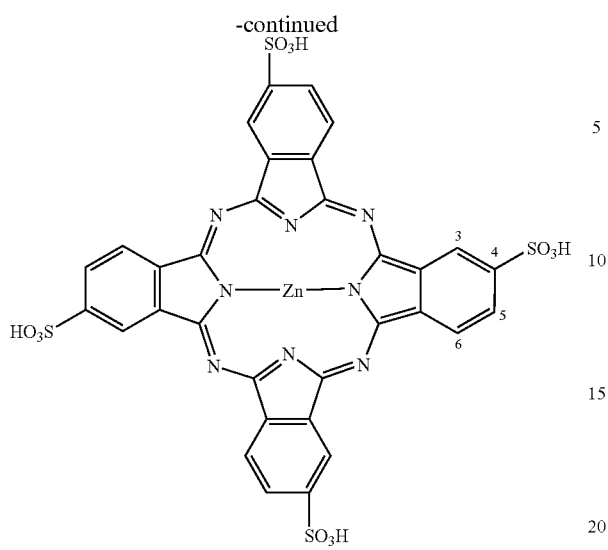

The content of sulfonic acid groups can be adjusted by addition of phthalic acid. Hence with this melt process sulfonated Zinc phthalocyanine derivatives having a degree of sulfonation between DS=1-4 can be prepared.

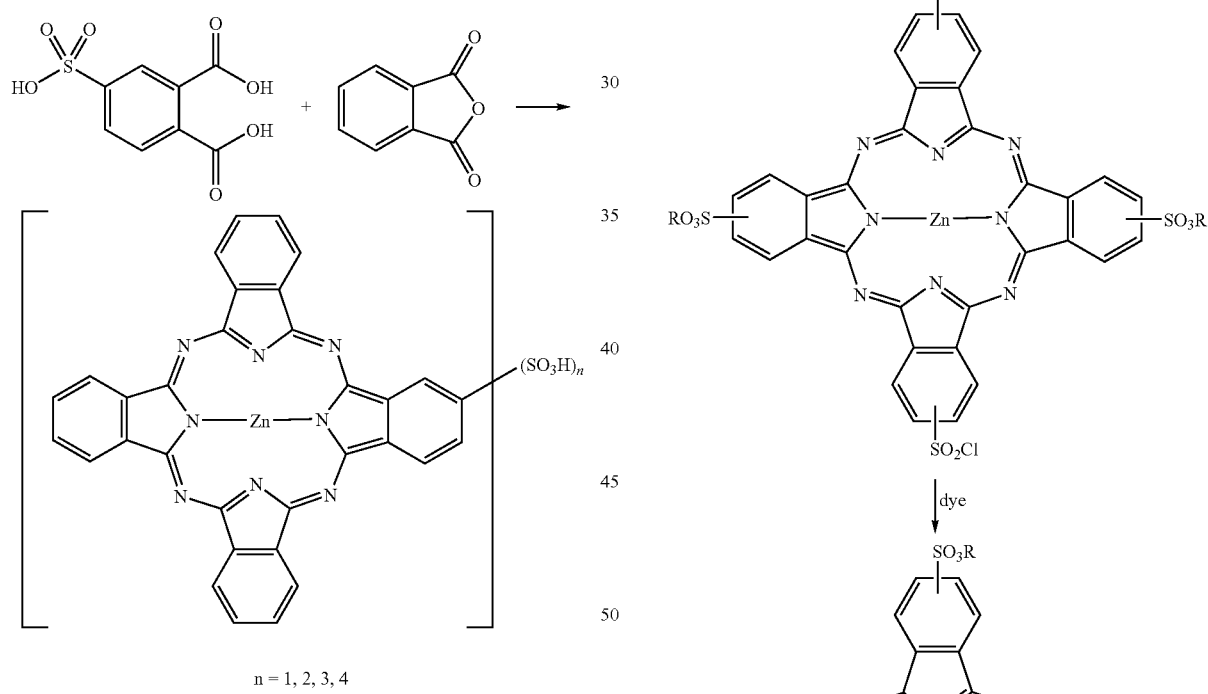

n = 1, 2, 3, 4

In the present application, a phthalocyanine molecule is being linked through covalent bonds with a mono-azo dye molecule via specific linking groups. A convenient way to realize this linkage is the synthesis of a metal phthalocyanine sulfonyl chloride by a sulfochlorination reaction after known procedures (DE2812261, DE0153278). By varying the amount of the sulfochlorination agent, the desired degree of sulfochloride content can be adjusted. The sulfochlorination reaction of phthalocyanines generally leads to a main product, but as by-products small amounts of lower or higher degree of sulfonyl chloride groups are detected.

The resulting reactive phthalocyanine-sulfonylchloride can then be reacted further with a suitable dye having an amino group.

To illustrate the synthesis, the following synthetic examples leading to zinc and aluminium phthalocyanines linked with amino-functionalized azo-dyes are given. The syntheses are performed as shown in the following scheme. From the possible positional isomers, only one is shown. The formation of the side products (degree of $SO_3R$ and $SO_2Cl$) is not shown.

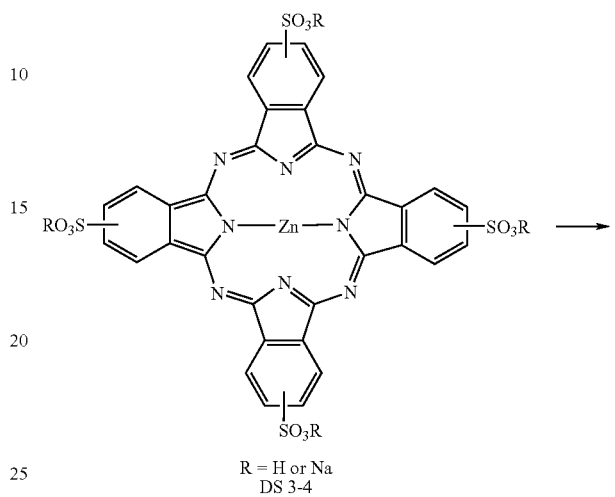

R = H or Na
DS 3-4

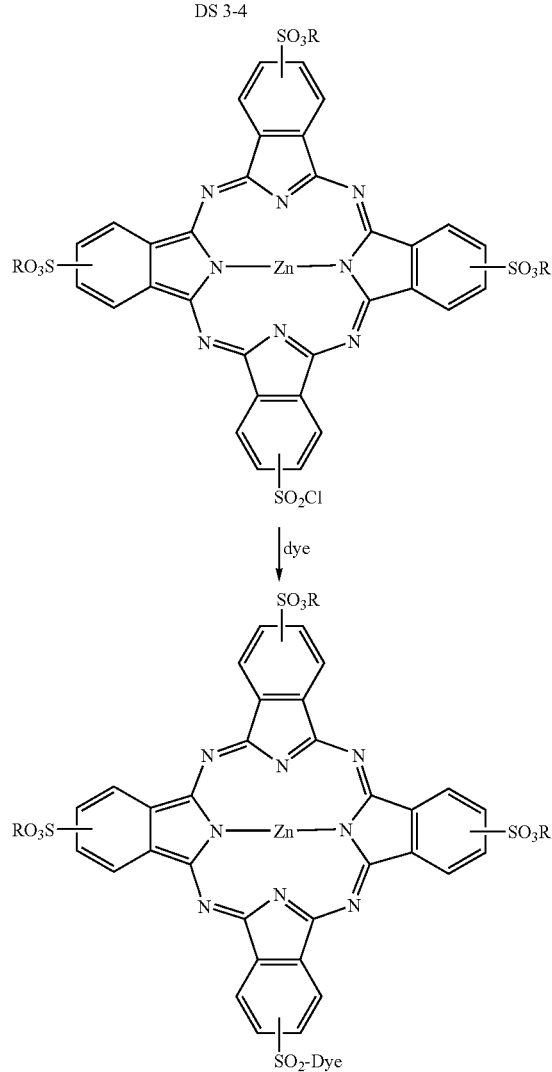

The synthesis of Zinc phthalocyanine derivatives with a lower degree of sulfonation and analogous activation and coupling to the corresponding Zinc phthalocyanine azo dyes is also possible.

The synthesis of exactly trisulfonated zinc phthalocyanine derivatives is known from literature [J. E. van Lier, Journ. Med. Chem. (1997), 40 (24) 3897] as a product from ring expansion reaction of boron tri(4-sulfo)subphthalocyanine.

The synthesis of less sulfonated metallated phthalocyanines can also be performed by a modified sulfonation reaction, i.e. by shortening of reaction time and/or reduction of reaction temperature.

D is the radical of a mono-azo dyestuff; and

L is a group

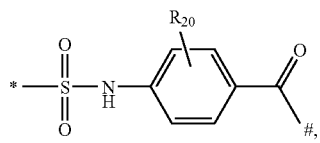

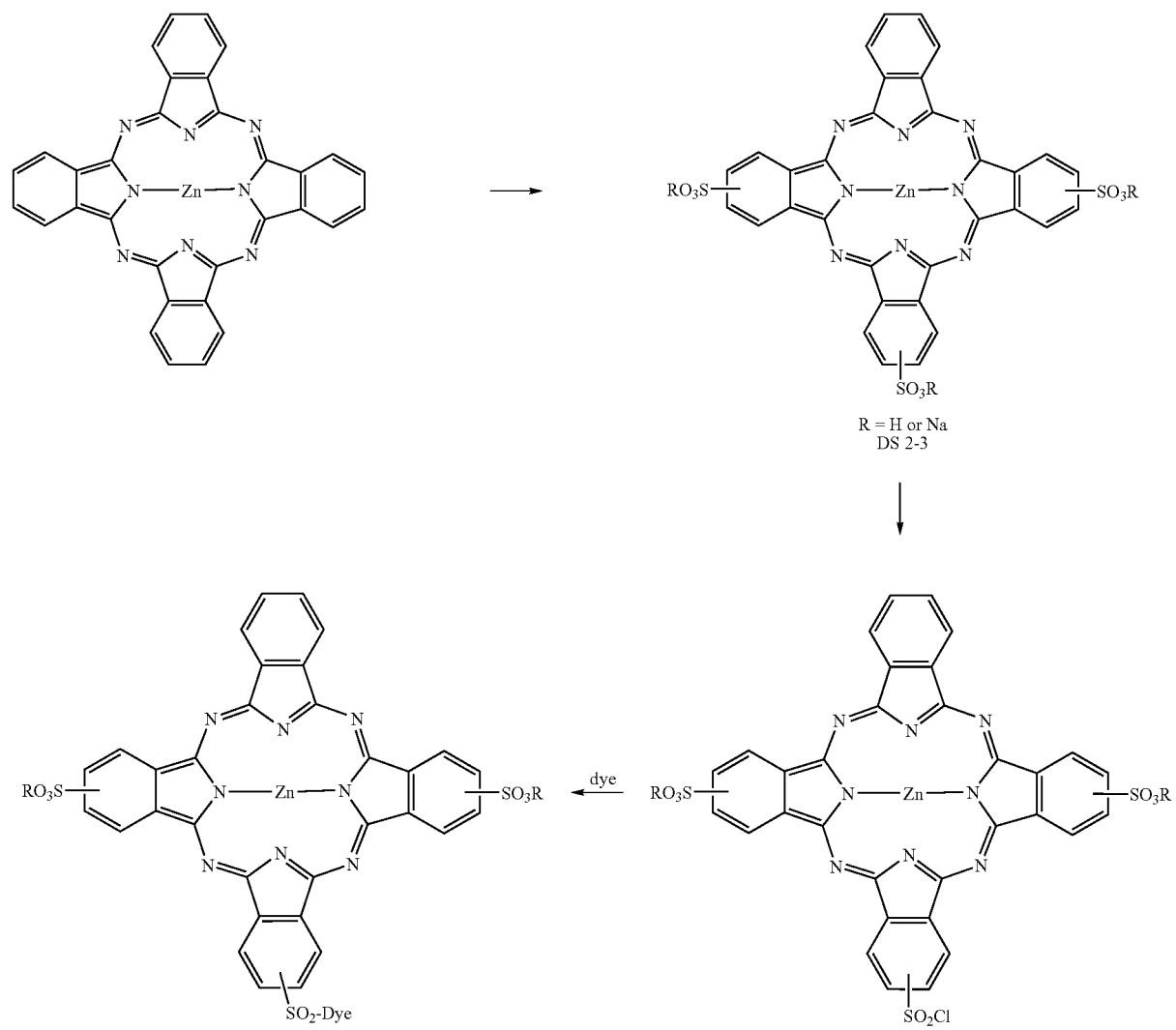

A further aspect of the invention is a shading process for textile fiber materials characterized by treating the textile fiber material with a composition comprising at least one Zn—, Ca—, Mg—, Na—, K—, Al, Si—, Ti—, Ge—, Ga—, Zr—, In— or Sn— phthalocyanine compound of formula (1)

(PC)-L-(D) (1) to which at least one mono-azo dyestuff is attached through a covalent bonding via a linking group L wherein PC is the metal-containing phthalocyanine ring system;

-continued

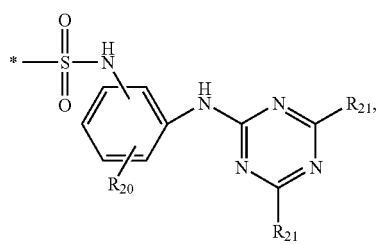

-continued

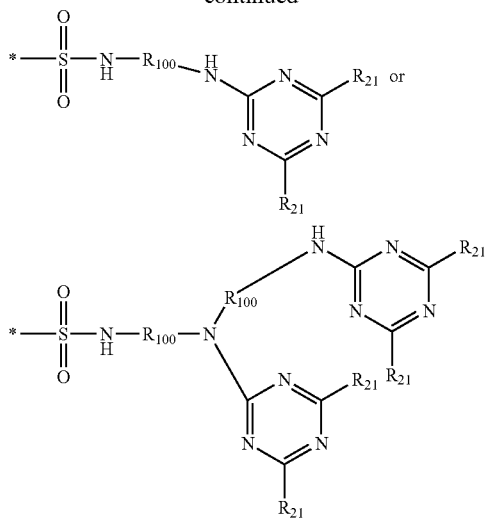

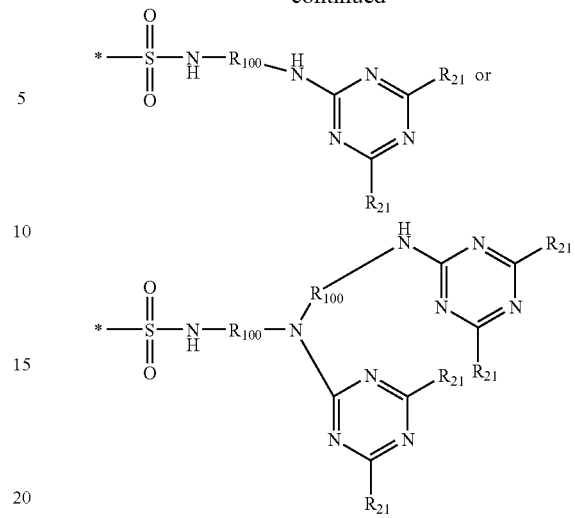

wherein
R$_{20}$ is hydrogen, C$_1$-C$_8$alkyl, C$_1$-C$_8$alkoxy or halogen;
R$_{21}$ is independently D, hydrogen, OH, Cl or F, with the proviso that at least one is D;
R$_{100}$ is C$_1$-C$_8$alkylene;
* is the point of attachment of PC;
# is the point of attachment for the dye.

In such a shading process the compounds of the instant invention are typically used in a detergent formulation. The amount of the compounds used is, for example, from 0.0001 to 1% by weight, preferably from 0.001 to 0.5% by weight, based on the weight of the textile material.

As for the following, the term shading composition is meant to encompass also the composition as such.

Also within the scope of the instant invention is a shading composition comprising at least one Zn—, Ca—, Mg—, Na—, K—, Al, Si—, Ti—, Ge—, Ga—, Zr—, In— or Sn— phthalocyanine compound of formula (1) (PC)-L-(D) (1) to which at least one mono-azo dyestuff is attached through a covalent bonding via a linking group L wherein PC is the metal-containing phthalocyanine ring system;
D is the radical of a mono-azo dyestuff; and
L is a group

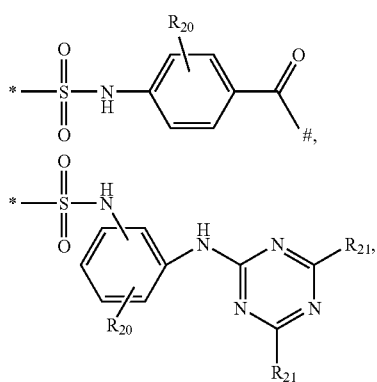

wherein
R$_{20}$ is hydrogen, C$_1$-C$_8$alkyl, C$_1$-C$_8$alkoxy or halogen;
R$_{21}$ is independently D, hydrogen, OH, Cl or F, with the proviso that at least one is D;
R$_{100}$ is C$_1$-C$_8$alkylene;
* is the point of attachment of PC;
# is the point of attachment of the dye.

The composition and process comprising at least one compound of formula (1) produces a relative hue angle of 220-320° and the compounds of formula (1) are not light stable. That means that the compounds of formula (1) of the shading composition are destroyed by light. Visible light (400 to 800 nm) is meant by the term "light". Preferably, it is sunlight.

Color coordinates and color differences are expressed using the internationally standardized CIELAB tristimulus values:
a*=red–green (+, −)
b*=yellow–blue (+, −)
L*=lightness (light=100)
C*=chroma
H*=hue (angle of 0°=red, 90°=yellow, 180°=green, 270°=blue),
and the color differences ΔE*, ΔH*, ΔC*, ΔL*, Δa*, and Δb*, together with an identification number of the sample.

This internationally accepted system has been developed by CIE ("Commission Internationale de l'Éclairage"). It is for example part of DIN 6174: 1979-01 as well as DIN 5033-3: 1992-07.

The composition and process comprising at least one compound of formula (1) produces a relative hue angle of 220-320° and the compounds of formula (1) are degraded when the composition is exposed to sunlight. Preferably, the compounds of formula (1) are destroyed by light, preferably sunlight, when they are applied onto the textile fiber material.

The composition comprising at least one compound of formula (1) produces a relative hue angle of 220-320° and the decrease rate of the compounds of formula (1) is at least 1% per 2 hours, preferably at least 2% when the composition is exposed to (sun)light.

For example, the degradation of the components can be determined spectrophotometrically.

Preferably, the degradation of the compound of formula (1) when applied onto the textile fiber material does not change the color of the textile fiber material, even if the textile fiber material is treated with these compounds repeatedly.

Examples of suitable textile fiber materials are materials made of silk, wool, polyamide, acrylics or polyurethanes, and, in particular, cellulosic fiber materials and blends of all types. Such fiber materials are, for example, natural cellulose fibers, such as cotton, linen, jute and hemp, and regenerated cellulose. Preference is given to textile fiber materials made of cotton. Also suitable are hydroxyl-containing fibers which are present in mixed fabrics, for example mixtures of cotton with polyester fibers or polyamide fibers.

The shading composition may be in any physical form, preferably in a solid or liquid form. Typical solid forms are powder, tablets or granulates.

Granulates are preferred as solid formulation.

A further aspect of the invention is a shading composition as described above in form of a granule comprising
 a) from 2 to 75% by weight (wt-%) of at least one phthalocyanine compound of formula (1) as defined hereinbefore, based on the total weight of the granulate,
 b) from 10 to 95 wt-% of at least one further additive, based on the total weight of the granulate, and
 c) from 0 to 15 wt-% water, based on the total weight of the granulate.

The sum of the wt-% of components a)-c) is always 100%.

Usually, the inventive shading process is part of a laundry washing process. It can be part of any step of the laundry washing process (pre-soaking, main washing and after-treatment). The process can be carried out in a washing machine as well as by hand. The usual temperature is between 5° C. and 95° C.

The washing or cleaning agents are usually formulated that the washing liquor has a pH value of about 6.5-11, preferably 7.5-11 during the whole washing procedure. The liquor ratio in the washing process is usually 1:4 to 1:40, preferably 1:4 to 1:30.

The washing procedure is usually done in a washing machine.
 There are various types of washing machines, for example:
 top-loader-washing machines with a verticle rotating axis; these machines, which have usually a capacity of about 45 to 83 litres, are used for washing processes at temperatures of 10-50° C. and washing cycles of about 10-60 minutes. Such types of washing machines are often used in the USA;
 front-loader-washing machine with a horizontal rotating axis; these machines, which have usually a capacity of about 8 to 15 litres, are used for washing processes at temperatures of 30-95° C. and washing cycles of about 10-60 minutes. Such types of washing machines are often used in Europe;
 top-loader-washing machines with a verticle rotating axis; these machines, which have usually a capacity of about 26 to 52 litres, are used for washing processes at temperatures of 5-25° C. and washing cycles of about 8-15 minutes. Such types of washing machines are often used in Japan.

The composition according to the invention can also be used in a soaking process, where the stained textiles are left for 0.1-24 hours in a solution or suspension of the detergent and/or bleaching laundry additive without agitation. Soaking can take place for example in a bucket or in a washing machine. Usually the textiles are washed and/or rinsed after the soaking process.

The granulates according to the invention can be encapsulated or not.

Encapsulating materials include especially water-soluble and water-dispersible polymers and waxes. Of those materials, preference is given to polyethylene glycols, polyamides, polyacrylamides, polyvinyl alcohols, polyvinylpyrrolidones, gelatin, hydrolyzed polyvinyl acetates, copolymers of vinylpyrrolidone and vinyl acetate, and also polyacrylates, paraffins, fatty acids, copolymers of ethyl acrylate with methacrylate and methacrylic acid, and poly-methacrylates.

The granulates according to the invention contain from 2 to 75 wt-%, preferably from 2 to 60 wt-%, especially from 5 to 55 wt-%, of component a), based on the total weight of the granulate.

The granulates in the formulations according to the invention contain from 10 to 95 wt-%, preferably from 10 to 85 wt-%, especially from 10 to 80 wt-%, of at least one further additive (component b)), based on the total weight of the granulate.

Such further additives may be anionic or non-ionic dispersing agents; water-soluble organic polymers; inorganic salts; low-molecular-weight organic acids or salts thereof or wetting agents in an amount of from 10% to 80% by weight; disintegrants such as, for example, powdered or fibrous cellulose, microcrystalline cellulose; fillers such as, for example, dextrin; water-insoluble or water-soluble dyes or pigments; and also dissolution accelerators and optical brighteners. Aluminium silicates such as zeolites, and also compounds such as talc, kaolin, $TiO_2$, $SiO_2$ or magnesium trisilicate may also be used in small amounts, for example 0-10% by weight, based on the weight of the total formulation.

The anionic dispersing agents used are, for example, the commercially available water-soluble anionic dispersing agents for dyes, pigments etc.

The following products, especially, come into consideration: condensation products of aromatic sulfonic acids and formaldehyde, condensation products of aromatic sulfonic acids with unsubstituted or chlorinated biphenyls or biphenyl oxides and optionally formaldehyde, (mono-/di-)alkylnaphthalenesulfonates, sodium salts of polymerized organic sulfonic acids, sodium salts of polymerized alkylnaphthalenesulfonic acids, sodium salts of polymerized alkylbenzenesulfonic acids, alkylarylsulfonates, sodium salts of alkyl polyglycol ether sulfates, polyalkylated polynuclear arylsulfonates, methylene-linked condensation products of arylsulfonic acids and hydroxyarylsulfonic acids, sodium salts of dialkylsulfosuccinic acids, sodium salts of alkyl diglycol ether sulfates, sodium salts of polynaphthalene-methanesulfonates, ligno- or oxyligno-sulfonates or heterocyclic polysulfonic acids. Especially suitable anionic dispersing agents are condensation products of naphthalene-sulfonic acids with formaldehyde, sodium salts of polymerized organic sulfonic acids, (mono-/di-)alkylnaphthalenesulfonates, polyalkylated polynuclear arylsulfonates, sodium salts of polymerized alkylbenzenesulfonic acid, lignosulfonates, oxylignosulfonates and condensation products of naphthalenesulfonic acid with a polychloromethylbiphenyl.

Suitable non-ionic dispersants are especially compounds having a melting point of, prefer-ably, at least 35° C. that are emulsifiable, dispersible or soluble, for example the following compounds:
1. fatty alcohols having from 8 to 22 carbon atoms, especially cetyl alcohol;
2. addition products of, preferably, from 2 to 80 mol of alkylene oxide, especially ethylene oxide, wherein some of the ethylene oxide units may have been replaced by substituted epoxides, such as styrene oxide and/or propylene oxide, with higher unsaturated or saturated monoalcohols, fatty acids, fatty amines or fatty amides having from 8 to 22 carbon atoms or with benzyl alcohols, phenyl phenols, benzyl phenols or alkyl phenols, the alkyl radicals of which have at least 4 carbon atoms;

3. alkylene oxide, especially propylene oxide, condensation products (block polymers);
4. ethylene oxide/propylene oxide adducts with diamines, especially ethylenediamine;
5. reaction products of a fatty acid having from 8 to 22 carbon atoms and a primary or secondary amine having at least one hydroxy-lower alkyl or lower alkoxy-lower alkyl group, or alkylene oxide addition products of such hydroxyalkyl-group-containing reaction products;
6. sorbitan esters, preferably with long-chain ester groups, or ethoxylated sorbitan esters, such as polyoxyethylene sorbitan monolaurate having from 4 to 10 ethylene oxide units or polyoxyethylene sorbitan trioleate having from 4 to 20 ethylene oxide units;
7. addition products of propylene oxide with a tri- to hexa-hydric aliphatic alcohol having from 3 to 6 carbon atoms, e.g. glycerol or pentaerythritol; and
8. fatty alcohol polyglycol mixed ethers, especially addition products of from 3 to 30 mol of ethylene oxide and from 3 to 30 mol of propylene oxide with aliphatic monoalcohols having from 8 to 22 carbon atoms.

Especially suitable non-ionic dispersants are surfactants of formula

$$R_{22}\text{—O-(alkylene-O)}_n\text{—}R_{23} \qquad (10)$$

wherein
$R_{22}$ is $C_8$-$C_{22}$alkyl or $C_8$-$C_{18}$alkenyl,
$R_{23}$ is hydrogen; $C_1$-$C_4$alkyl; a cycloaliphatic radical having at least 6 carbon atoms or benzyl, $C_8$-$C_{12}$alkenyl
"alkylene" is an alkylene radical having from 2 to 4 carbon atoms and
n is an integer from 1 to 60.

The substituents $R_{22}$ and $R_{23}$ in formula (10) are advantageously each the hydrocarbon radical of an unsaturated or, preferably, saturated aliphatic monoalcohol having from 8 to 22 carbon atoms. The hydrocarbon radical may be straight-chain or branched. $R_{22}$ and $R_{23}$ are preferably each independently of the other an alkyl radical having from 9 to 14 carbon atoms.

Aliphatic saturated monoalcohols that come into consideration include natural alcohols, e.g. lauryl alcohol, myristyl alcohol, cetyl alcohol or stearyl alcohol, and also synthetic alcohols, e.g. 2-ethylhexanol, 2,4-dimethyl-pentan-2-ol, octan-2-ol, isononyl alcohol, trimethylhexanol, trimethylnonyl alcohol, decanol, $C_9$-$C_{11}$oxo-alcohol, tridecyl alcohol, isotridecyl alcohol and linear primary alcohols (Alfols) having from 8 to 22 carbon atoms. Some examples of such Alfols are Alfol (8-10), Alfol (9-11), Alfol (10-14), Alfol (12-13) and Alfol (16-18). ("Alfol" is a registered trade mark of the Sasol Corp.).

Unsaturated aliphatic monoalcohols are, for example, dodecenyl alcohol, hexadecenyl alcohol and oleyl alcohol.

The alcohol radicals may be present singly or in the form of mixtures of two or more components, e.g. mixtures of alkyl and/or alkenyl groups that are derived from soybean fatty acids, palm kernel fatty acids or tallow oils. Such granules are for example described in WO 2006/024612.

Instead of or in addition to the dispersing agent or agents, the granulates according to the invention may comprise a water-soluble organic polymer, which may also have dispersing properties. Such polymers may be used singly or as mixtures of two or more polymers. As water-soluble polymers (which may, but need not, have film-forming properties), there come into consideration, for example, gelatins, polyacrylates, polymethacrylates, copolymers of ethyl acrylate, methyl methacrylate and methacrylic acid (ammonium salt), polyvinylpyrrolidones, vinylpyrrolidones, vinyl acetates, copolymers of vinylpyrrolidone with long-chain olefins, poly(vinylpyrrolidone/dimethylaminoethyl methacrylates), copolymers of vinylpyrrolidone/dimethylaminopropyl methacrylamides, copolymers of vinyl-pyrrolidone/dimethylaminopropyl acrylamides, quaternised copolymers of vinylpyrrolidones and dimethylaminoethyl methacrylates, terpolymers of vinylcaprolactam/vinyl-pyrrolidone/dimethylaminoethyl methacrylates, copolymers of vinylpyrrolidone and methacrylamidopropyltrimethylammonium chloride, terpolymers of caprolactam/vinyl-pyrrolidone/dimethylaminoethyl methacrylates, copolymers of styrene and acrylic acid, polycarboxylic acids, polyacrylamides, carboxymethyl cellulose, hydroxymethyl cellulose, polyvinyl alcohols, hydrolyzed and non-hydrolyzed polyvinyl acetate, copolymers of maleic acid with unsaturated hydrocarbons and also mixed polymerization products of the mentioned polymers. Further suitable substances are polyethylene glycol (MW=2000–20 000), copolymers of ethylene oxide with propylene oxide (MW>3500), condensation products (block polymerization products) of alkylene oxide, especially propylene oxide, copolymers of vinylpyrrolidone with vinyl acetate, ethylene oxide-propylene oxide addition products with diamines, especially ethylenediamine, polystyrene-sulfonic acid, polyethylene-sulfonic acid, copolymers of acrylic acid with sulfonated styrenes, gum arabic, hydroxypropyl methylcellulose, sodium carboxymethyl cellulose, hydroxypropyl methylcellulose phthalate, maltodextrin, starch, sucrose, lactose, enzymatically modified and subsequently hydrated sugars, as are obtainable under the name "Isomalt", cane sugar, polyaspartic acid and tragacanth.

Among those water-soluble organic polymers, special preference is given to carboxymethyl cellulose, polyacrylamides, polyvinyl alcohols, polyvinylpyrrolidones, gelatins, hydrolyzed polyvinyl acetates, copolymers of vinylpyrrolidone and vinyl acetate, maltodextrins, polyaspartic acid and also polyacrylates and polymethacrylates.

For use as inorganic salts there come into consideration carbonates, hydrogen carbonates, phosphates, polyphosphates, sulfates, silicates, sulfites, borates, halides and pyrophosphates, preferably in the form of alkali metal salts. Preference is given to water-soluble salts such as, for example, alkali metal chlorides, alkali metal phosphates, alkali metal carbonates, alkali metal polyphosphates and alkali metal sulfates and water-soluble salts used in washing agent and/or washing agent additive formulations.

The optical brighteners may be selected from a wide range of chemical types such as 4,4'-bis-(triazinylamino)-stilbene-2,2'-disulfonic acids, 4,4'-bis-(triazol-2-yl)stilbene-2,2'-disulfonic acids, 4,4'-(diphenyl)-stilbenes, 4,4'-distyryl-biphenyls, 4-phenyl-4'-benzoxazolyl-stilbenes, stilbenzyl-naphthotriazoles, 4-styryl-stilbenes, bis-(benzoxazol-2-yl) derivatives, bis-(benzimidazol-2-yl) derivatives, coumarines, pyrazolines, naphthalimides, triazinyl-pyrenes, 2-styryl-benzoxazole- or -naphthoxazole derivatives, benzimidazole-benzofuran derivatives or oxanilide derivatives. These optical brighteners are known and commercially available. They are described inter alia in WO 2006/024612.

Especially preferred are the non-ionic or the anionic optical brighteners.

The granulates in the formulations according to the invention preferably have an average particle size of <500 µm. Greater preference is given to the particle size of the granulates being from 40 to 400 µm.

A preferred embodiment of the present invention relates to granulates comprising
- a) from 2 to 75 wt-% of at least one phthalocyanine compound of formula (1) as defined hereinbefore, based on the total weight of the granulate,
- b) from 10 to 95 wt-% of at least one further additive selected from the group consisting of anionic or non-ionic dispersing agents; water-soluble organic polymers; inorganic salt; low-molecular-weight organic acid or a salt thereof; wetting agents; disintegrants such as, for example, powdered or fibrous cellulose, microcrystalline cellulose; fillers such as, for example, dextrin; water-insoluble or water-soluble dyes or pigments; dissolution accelerators; optical brighteners; aluminium silicates; talc, kaolin, $TiO_2$, $SiO_2$ and magnesium trisilicate, and
- c) from 0 to 15 wt-% water, based on the total weight of the granulate.

A more preferred embodiment of the present invention relates to granulates comprising
- a) from 2 to 75 wt-% of at least one phthalocyanine compound of formula (1) as defined hereinbefore, based on the total weight of the granulate,
- b) from 10 to 95 wt-% of at least one further additive selected from the group consisting of anionic or non-ionic dispersing agents; water-soluble organic polymers; inorganic salt; low-molecular-weight organic acid or a salt thereof; wetting agents; disintegrants such as, for example, powdered or fibrous cellulose, microcrystalline cellulose; fillers such as, for example, dextrin; water-insoluble or water-soluble dyes or pigments; dissolution accelerators; optical brighteners; aluminium silicates; talc, kaolin, $TiO_2$, $SiO_2$ and magnesium trisilicate, and
- c) from 0 to 15 wt-% water, based on the total weight of the granulate.

Another embodiment of the invention is a composition, especially a shading composition, as described above in liquid form comprising
- (a) 0.01-95 wt-%, preferably 1-80 wt-%, more preferably 5-70 wt-% of a phthalocyanine compound of formula (1) as defined hereinbefore, based on the total weight of the liquid formulation,
- (b) 5-99.99 wt-%, preferably 20-99 wt-%, more preferably 30-95 wt-%, based on the total weight of the liquid formulation, of at least one solvent and
- (c) 0-10 wt-%, preferably 0-5 wt-%, more preferably 0-2 wt-%, based on the total weight of the liquid formulation, of at least one further additive.

As solvents, polar solvents are preferred. Especially preferred are $C_1$-$C_4$-alcohols or water.

If appropriate, the liquid formulation according to the invention can further comprise optional additives; examples are preservatives or mixtures of preservatives, such as chloroacetamide, triazine derivates, benzoisothiazolines, 2-methyl-2H-isothiazol-3 on, 2-octyl-2H-isothiazol-3 on, 2-brom-2-nitropropan-1,3-diol or aqueous formaldehyde solution; Mg/Al silicates or mixtures of Mg/Al silicates, such as bentonite, montmorillonite, zeolites or highly disperse silicic acids; odour improvers and perfuming agent or mixtures thereof; antifoam agents or mixtures thereof; builders or mixtures thereof; protective colloids or mixtures thereof; stabilizers or mixtures thereof; sequestering agents and antifreeze agents or mixtures thereof, such as propylene glycol.

A more preferred embodiment of the present invention relates to a liquid formulation comprising
- (a) 0.01-95 wt-%, preferably 1-80 wt-%, more preferably 5-70 wt-% of a phthalocyanine compound of formula (1) as defined hereinbefore, based on the total weight of the liquid formulation,
- (b) 5-99.99 wt-%, preferably 20-99 wt-%, more preferably 30-95 wt-%, based on the total weight of the liquid formulation, of $C_1$-$C_4$-alcohols or water, and
- (c) 0-10 wt-%, preferably 0-5 wt-%, more preferably 0-2 wt-%, based on the total weight of the liquid formulation, of at least one additive selected from the group consisting of preservatives; Mg/Al silicates; odour improvers; perfuming agent; antifoam agents; builders; protective colloids; stabilizers; sequestering agents and antifreeze agents.

The shading composition according to the invention is used especially in a washing or softener formulation. Such a washing or softener formulation may be in solid, liquid, gel-like or paste-like form, for example in the form of a liquid, non-aqueous washing agent composition containing not more than 5 wt-%, preferably from 0 to 1 wt-%, water and based on a suspension of a builder substance in a non-ionic surfactant, for example as described in GB-A-2 158 454.

The washing formulations may also be in the form of powders or (super-)compact powders, in the form of single- or multi-layer tablets (tabs), in the form of washing agent bars, washing agent blocks, washing agent sheets, washing agent pastes or washing agent gels, or in the form of powders, pastes, gels or liquids used in capsules or in pouches (sachets).

However, the washing agent compositions are preferably in the form of non-aqueous formulations, powders, tabs or granules.

The present invention accordingly relates also to washing agent formulations comprising
- I) from 5 to 70 wt-% A) of at least one anionic surfactant and/or B) at least one non-ionic surfactant, based on the total weight of the washing agent formulation,
- II) from 0 to 60 wt-% C) of at least one builder substance, based on the total weight of the washing agent formulation,
- III) from 0 to 30 wt-% D) of at least one peroxide and, optionally, at least one activator and/or at least one catalyst, based on the total weight of the washing agent formulation, and
- IV) from 0.001 to 5 wt-% E) of granulate as defined above, based on the total weight of the washing agent formulation,
- V) from 0 to 60 wt-% F) of at least one further additive, based on the total weight of the washing agent formulation, and
- VI) from 0 to 5 wt-% G) water, based on the total weight of the washing agent formulation.

The sum of the wt-% of components I)-VI) in a formulation is always 100%.

The anionic surfactant A) can be, for example, a sulfate, sulfonate or carboxylate surfactant or a mixture thereof. Preferred sulfates are those having from 12 to 22 carbon atoms in the alkyl radical, optionally in combination with alkyl ethoxysulfates in which the alkyl radical has from 10 to 20 carbon atoms.

Preferred sulfonates are e.g. alkylbenzenesulfonates having from 9 to 15 carbon atoms in the alkyl radical. The cation in the case of anionic surfactants is preferably an alkali metal cation, especially sodium.

The anionic surfactant component may be, e.g., an alkylbenzenesulfonate, an alkylsulfate, an alkylethersulfate, an olefinsulfonate, an alkanesulfonate, a fatty acid salt, an alkyl or alkenyl ether carboxylate or an α-sulfofatty acid salt or an ester thereof. Preferred are alkylbenzenesulfonates having 10 to 20 carbon atoms in the alkyl group, alkylsulfates having 8 to 18 carbon atoms, alkylethersulfates having 8 to 22 carbon atoms, and fatty acid salts being derived from palm oil or tallow and having 8 to 22 carbon atoms. The average molar number of ethylene oxide added in the alkylethersulfate is preferably 1 to 22, preferably 1 to 10. The salts are preferably derived from an alkaline metal like sodium and potassium, especially sodium. Highly preferred carboxylates are alkali metal sarcosinates of formula $R_{109}$—CO($R_{110}$)$CH_2COOM_1$ in which $R_{109}$ is alkyl or alkenyl having 8-20 carbon atoms in the alkyl or alkenyl radical, $R_{110}$ is $C_1$-$C_4$ alkyl and $M_1$ is an alkali metal, especially sodium.

The nonionic surfactant component B) may be, e.g., primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

The total amount of anionic surfactant and nonionic surfactant is preferably 5-50 wt-%, preferably 5-40 wt-% and more preferably 5-30 wt-%. As to these surfactants it is preferred that the lower limit is 10 wt-%.

The non-ionic surfactant B) can be, for example, a condensation product of from 3 to 8 mol of ethylene oxide with 1 mol of a primary alcohol having from 9 to 15 carbon atoms.

As builder substance C) there come into consideration, for example, alkali metal phos-phates, especially tripolyphosphates, carbonates or hydrogen carbonates, especially their sodium salts, silicates, aluminosilicates, polycarboxylates, polycarboxylic acids, organic phosphonates, aminoalkylenepoly(alkylenephosphonates) or mixtures of those compounds.

Especially suitable silicates are sodium salts of crystalline layered silicates of the formula $NaHSi_tO_{2t+1} \cdot pH_2O$ or $Na_2Si_tO_{2t+1} \cdot pH_2O$ wherein t is a number from 1.9 to 4 and p is a number from 0 to 20.

Among the aluminosilicates, preference is given to those commercially available under the names zeolith A, B, X and HS, and also to mixtures comprising two or more of those components. Zeolith A is preferred.

Among the polycarboxylates, preference is given to polyhydroxycarboxylates, especially citrates, and acrylates and also copolymers thereof with maleic anhydride. Preferred poly-carboxylic acids are nitrilotriacetic acid, ethylenediaminetetraacetic acid and ethylene-diamine disuccinate either in racemic form or in the enantiomerically pure (S,S) form.

Phosphonates or aminoalkylenepoly(alkylenephosphonates) that are especially suitable are alkali metal salts of 1-hydroxyethane-1,1-diphosphonic acid, nitrilotris(methylenephosphonic acid), ethylenediaminetetramethylenephosphonic acid, hexamethylenediamin N,N,N',N' tetrakis methanphosphonic acid and diethylenetriaminepentamethylenephosphonic acid, as well as the salts therefrom. Also preferred polyphosphonates have the following formula

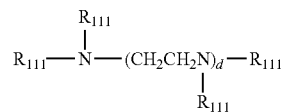

wherein
$R_{111}$ is $CH_2PO_3H_2$ or a water soluble salt thereof and
d is an integer of the value 0, 1, 2 or 3
are preferred.

Especially preferred are the polyphosphonates wherein b is an integer of the value of 1.

Suitable peroxide components D) include, for example, the organic and inorganic peroxides (like sodium percarbonate or sodium perborate) known in the literature and available commercially that bleach textile materials at conventional washing temperatures, for example at from 5 to 95° C.

The amount of the peroxide or the peroxide-forming substance is preferably 0.5-30% by weight, more preferably 1-20% by weight and especially preferably 1-15% by weight.

It is, however, also possible that no peroxide or peroxide forming substance is present.

As the peroxide component D) there come into consideration every compound which is capable of yielding hydrogen peroxide in aqueous solutions, for example, the organic and inorganic peroxides known in the literature and available commercially that bleach textile materials at conventional washing temperatures, for example at from 5 to 95° C.

The organic peroxides are, for example, mono- or polyperoxides, urea peroxides, a combination of a $C_1$-$C_4$alkanol oxidase and $C_1$-$C_4$alkanol (Such as methanol oxidase and ethanol as described in WO95/07972), alkylhydroxy peroxides, such as cumene hydroperoxide and t-butyl hydroperoxide, organic mono peracids of formula

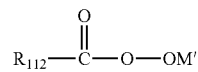

wherein
M signifies hydrogen or a cation,
$R_{112}$ signifies unsubstituted $C_1$-$C_{18}$alkyl; substituted $C_1$-$C_{18}$alkyl; unsubstituted aryl; substituted aryl; —($C_1$-$C_6$alkylene)-aryl, wherein the alkylene and/or the alkyl group may be substituted; and phthalimido$C_1$-$C_8$alkylene, wherein the phthalimido and/or the alkylene group may be substituted. Preferred mono organic peroxy acids and their salts are those of formula

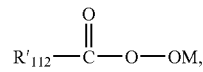

wherein
M signifies hydrogen or an alkali metal, and
$R'_{112}$ signifies unsubstituted $C_1$-$C_4$alkyl; phenyl; —$C_1$-$C_2$alkylene-phenyl or phthalimido$C_1$-$C_8$alkylene.

Especially preferred is $CH_3COOOH$ and its alkali salts.

Especially preferred is also ε-phthalimido peroxy hexanoic acid and its alkali salts.

Instead of the peroxy acid it is also possible to use organic peroxy acid precursors and $H_2O_2$. Such precursors are the corresponding carboxyacid or the corresponding carboxyanhydrid or the corresponding carbonylchlorid, or amides, or esters, which can form the peroxy acids on perhydrolysis. Such reactions are commonly known.

Peroxy acids may also be generated from precursors such as bleach activators, that is to say compounds that, under perhydrolysis conditions, yield unsubstituted or substituted perbenzo- and/or peroxo-carboxylic acids having from 1 to 10 carbon atoms, especially from 2 to 4 carbon atoms. Suitable bleach activators include the customary bleach activators, mentioned at the beginning, that carry O- and/or N-acyl groups having the indicated number of carbon atoms and/or unsubstituted or substituted benzoyl groups. Preference is given to polyacylated alkylenediamines, especially tetraacetylethylenediamine (TAED), acylated glycolurils, especially tetraacetylglycoluril (TAGU), N,N-diacetyl-N,N-dimethylurea (DDU), acylated triazine derivatives, especially 1,5-diacetyl-2,4-dioxohexahydro-1,3,5-triazine (DADHT), compounds of formula:

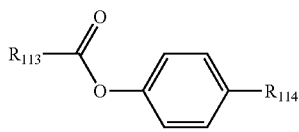

wherein $R_{114}$ is a sulfonate group, a carboxylic acid group or a carboxylate group, and wherein $R_{113}$ is linear or branched $(C_7-C_{15})$alkyl, especially activators known under the names SNOBS, SLOBS and DOBA, acylated polyhydric alcohols, especially triacetin, ethylene glycol diacetate and 2,5-diacetoxy-2,5-dihydrofuran, and also acetylated sorbitol and mannitol and acylated sugar derivatives, especially pentaacetylglucose (PAG), sucrose polyacetate (SUPA), pentaacetylfructose, tetraacetylxylose and octaacetyllactose as well as acetylated, optionally N-alkylated glucamine and gluconolactone. It is also possible to use the combinations of conventional bleach activators known from German Patent Application DE-A-44 43 177. Nitrile compounds that form peroxyimidic acids with peroxides also come into consideration as bleach activators.

Also suitable are diperoxyacids, for example, 1,12-diperoxydodecanedioic acid (DPDA), 1,9-diperoxyazelaic acid, diperoxybrassilic acid; diperoxysebasic acid, diperoxyisophthalic acid, 2-decyldiperoxybutane-1,4-diotic acid and 4,4'-sulphonylbisperoxybenzoic acid.

Preferably, however, inorganic peroxides are used, for example persulfates, perborates, percarbonates and/or persilicates.

Example of suitable inorganic peroxides are sodium perborate tetrahydrate or sodium percarbonate monohydrate, inorganic peroxyacid compounds, such as for example potassium monopersulphate (MPS). If organic or inorganic peroxyacids are used as the peroxygen compound, the amount thereof will normally be within the range of about 1-10 wt-%, preferably from 2-8 wt-%.

All these peroxy compounds may be utilized alone or in conjunction with a peroxyacid bleach precursor and/or an organic bleach catalyst not containing a transition metal. Generally, the bleaching composition of the invention can be suitably formulated to contain from 2 to 35 wt-%, preferably from 5 to 25 wt-%, of the peroxy bleaching agent.

Peroxyacid bleach precursors are known and amply described in literature, such as in the British Patents 836988; 864,798; 907,356; 1,003,310 and 1,519,351; German Patent 3,337,921; EP-A-0185522; EP-A-0174132; EP-A-0120591; and U.S. Pat. Nos. 1,246,339; 3,332,882; 4,128,494; 4,412,934 and 4,675,393. Preferred are transition metal catalysts disclosed in WO 01/05925), especially preferred the 1:1 Mn(III) complexes.

Another useful class of peroxyacid bleach precursors is that of the cationic i.e. quaternary ammonium substituted peroxyacid precursors as disclosed in U.S. Pat. Nos. 4,751, 015 and 4,397,757, in EP-A0284292 and EP-A-331,229. Examples of peroxyacid bleach precursors of this class are: 2-(N,N,N-trimethyl ammonium) ethyl sodium-4-sulphonphenyl carbonate chloride—(SPCC), N-octyl,N,N-dimethyl-N10-carbophenoxy decyl ammonium chloride —(ODC), 3-(N,N,N-trimethyl ammonium) propyl sodium-4-sulphophenyl carboxylate and N,N,N-trimethyl ammonium toluoyloxy benzene sulphonate.

A further special class of bleach precursors is formed by the cationic nitriles as disclosed in EP-A-303,520, WO 96/40661 and in European Patent Specification No.'s 458, 396, 790244 and 464,880.

Any one of these peroxyacid bleach precursors can be used in the present invention, though some may be more preferred than others.

Of the above classes of bleach precursors, the preferred classes are the esters, including acyl phenol sulphonates and acyl alkyl phenol sulphonates; the acyl-amides; and the quaternary ammonium substituted peroxyacid precursors including the cationic nitriles.

Examples of said preferred peroxyacid bleach precursors or activators are sodium-4-benzoyloxy benzene sulphonate (SBOBS); N,N,N'N'-tetraacetyl ethylene diamine (TAED); sodium-1-methyl-2-benzoyloxy benzene-4-sulphonate; sodium-4-methyl-3-benzoloxy benzoate; SPCC; trimethyl ammonium toluoyloxy-benzene sulphonate; sodium nonanoyloxybenzene sulphonate (SNOBS); sodium 3,5,5-trimethyl hexanoyl-oxybenzene sulphonate (STHOBS); and the substituted cationic nitriles.

The precursors may be used in an amount of up to 12%, preferably from 1-10% by weight, of the composition.

It will be understood that mixtures of inorganic and/or organic peroxides can also be used. The peroxides may be in a variety of crystalline forms and have different water contents, and they may also be used together with other inorganic or organic compounds in order to improve their storage stability.

The peroxides are added to the agent preferably by mixing the components, for example using a screw metering system and/or a fluidised bed mixer.

The agents may comprise, in addition to the combination according to the invention, one or more optical brighteners, for example from the class bis-triazinylamino-stilbenedisulfonic acid, bis-triazolyl-stilbenedisulfonic acid, bis-styrylbiphenyl or bis-benzofuranylbiphenyl, a bis-benzoxalyl derivative, bis-benzimidazolyl derivative or coumarin derivative or a pyrazoline derivative.

The detergents used will usually contain one or more auxiliaries such as soil suspending agents, for example sodium carboxymethylcellulose; salts for adjusting the pH, for example alkali or alkaline earth metal silicates; foam regulators, for example soap; salts for adjusting the spray drying and granulating properties, for example sodium sulphate; perfumes; and also, if appropriate, antistatic and softening agents; such as smectite clays; photobleaching agents; pigments; and/or shading agents. These constituents preferably should, of course, be stable to any bleaching system employed. Such auxiliaries can be present in an amount of, for example, 0.1 to 20 wt-%, preferably 0.5 to 10 wt-%, especially 0.5 to 5 wt-%, based on the total weight of the detergent.

Furthermore, the detergent can optionally contain enzymes. Enzymes can be added to detergents for stain removal. The enzymes usually improve the performance on stains that are either protein- or starch-based, such as those caused by blood, milk, grass or fruit juices. Preferred enzymes are cellulases, proteases, amylases and lipases. Preferred enzymes are cellulases and proteases, especially proteases. Cellulases are enzymes which act on cellulose and its derivatives and hydrolyze them into glucose, cellobiose, cellooligosaccharide. Cellulases remove dirt and have the effect of mitigating the roughness to the touch. Examples of enzymes to be used include, but are by no means limited to, the following:

proteases as given in U.S. Pat. No. B-6,242,405, column 14, lines 21 to 32;

lipases as given in U.S. Pat. No. B-6,242,405, column 14, lines 33 to 46 and as given in WO 0060063;

amylases as given in U.S. Pat. No. B-6,242,405, column 14, lines 47 to 56; and cellulases as given in U.S. Pat. No. B-6,242,405, column 14, lines 57 to 64.

Commercially available detergent proteases, such as Alcalase®, Esperase®, Everlase®, Savinase®, Kannase® and Durazym®, are sold e.g. by NOVOZYMES A/S.

Commercially available detergent amylases, such as Termamyl®, Duramyl®, Stainzyme®, Natelase®, Ban® and Fungamyl®, are sold e.g. by NOVOZYMES A/S.

Commercially available detergent ellulases, such as Celluzyme®, Carezyme® and Endolase®, are sold e.g. by NOVOZYMES A/S.

Commercially available detergent lipases, such as Lipolase®, Lipolase Ultra® and Lipoprime®, are sold e.g. by NOVOZYMES A/S.

Suitable mannanases, such as Mannanaway®, are sold by NOVOZYMES A/S.

The enzymes can optionally be present in the detergent. When used, the enzymes are usually present in an amount of 0.01-5 wt-%, preferably 0.05-5 wt-% and more preferably 0.1-4 wt-%, based on the total weight of the detergent.

Further preferred additives to the agents according to the invention are dye fixing agents and/or polymers which, during the washing of textiles, prevent staining caused by dyes in the washing liquor that have been released from the textiles under the washing conditions. Such polymers are preferably polyvinylpyrrolidones, polyvinylimidazole or polyvinylpyridine-N-oxides which may have been modified by the incorporation of anionic or cationic substituents, especially those having a molecular weight in the range of from 5000 to 60000, more especially from 5000 to 50000. Such polymers are usually used in an amount of from 0.01 to 5 wt-%, preferably 0.05 to 5 wt-%, especially 0.1 to 2 wt-%, based on the total weight of the detergent. Preferred polymers are those given in WO-A-02/02865 (see especially page 1, last paragraph and page 2, first paragraph).

The granulates are prepared according to known methods. Any known method is suitable to produce granules comprising the inventive mixture. Continuous or discontinuous methods are suitable, Continuous methods, such as spray drying or fluidised bed granulation processes are preferred.

Especially suitable are spray-drying processes in which the active ingredient solution is sprayed into a chamber with circulating hot air. The atomisation of the solution is carried out using single or binary nozzles or is brought about by the spinning effect of a rapidly rotating disc. In order to increase the particle size, the spray-drying process may be combined with additional agglomeration of the liquid particles with solid nuclei in a fluidised bed that forms an integral part of the chamber (so-called fluidised spray). The fine particles (<100 µm) obtained by a conventional spray-drying process may, if necessary after being separated from the exhaust gas flow, be fed as nuclei, without being further treated, directly into the spray cone of the atomiser of the spray-dryer, for the purpose of agglomeration with the liquid droplets of the active ingredient. During the granulation step, the water can be rapidly removed from the solutions comprising phthalocyanine compound, and, where appropriate, further additives, and it is expressly intended that agglomeration of the droplets forming in the spray cone, i.e. the agglomeration of droplets with solid particles, will take place. Preference is given to the use of agglomeration processes to produce the granulates according to the invention because such processes usually yield a higher bulk weight so that the granulates have better compatibility with washing agent formulations.

The amount of (PC)-L-Dye compounds described herein before in the granulate, is for example, from to 0.01 to 20 wt-%, preferably from 0.01 to 0.5 wt-% and very especially from 0.05 to 0.3 wt-%.

The washing agent formulation according to the invention can be prepared in a generally known manner.

A formulation in powder form can be prepared, for example, by first preparing an initial powder by spray-drying an aqueous slurry comprising all of the afore-mentioned components except for components D) and E) and then adding the dry components D) and E) and mixing all of them together. It is also possible to start from an aqueous slurry which, although comprising components A) and C), does not comprise component B) or comprises only a portion of component B). The slurry is spray-dried; component E) is then mixed with component B) and added; and then component D) is mixed in dry. The components are preferably mixed with one another in such amounts that a solid compact washing agent composition in granule form is obtained, having a specific weight of at least 500 g/l.

In another preferred embodiment, the production of the washing agent composition is carried out in three steps. In the first step a mixture of anionic surfactant (and, where appropriate, a small amount of non-ionic surfactant) and builder substance is prepared. In the second step that mixture is sprayed with the major portion of the non-ionic surfactant and then, in the third step, peroxide and, where appropriate, catalyst, and the granulate according to the invention are added. That method is usually carried out in a fluidised bed. In a further preferred embodiment, the individual steps are not carried out completely separately, so that there is a certain amount of overlap between them. Such a method is usually carried out in an extruder, in order to obtain granulates in the form of "megapearls".

As an alternative thereto, the granulates according to the invention can, for the purpose of admixture with a washing agent in a post-dosing step, be mixed with other washing agent components such as phosphates, zeolites, brighteners or enzymes.

A mixture of that kind for post-dosing of the granulates is distinguished by a homogeneous distribution of the granulates according to the invention in the mixture and can consist of, for example, from 5 to 50% granulates and from 95 to 50% sodium tripolyphosphate. Where the dark appearance of the granulate in the washing agent composition is to be suppressed, this can be achieved, for example, by embedding the granules in droplets of a whitish meltable substance ("water-soluble wax") or, preferably, by encapsulating the granules in a melt consisting of, for example, a water-soluble wax, as described in EP-B-0 323 407 B1, a white solid (e.g. titanium dioxide) being added to the melt in order to reinforce the masking effect of the capsule.

The detergent may also be formulated as an aqueous liquid comprising 5-50, preferably 10-35 wt-% of water or as a non-aqueous liquid detergent, containing not more than 5, preferably 0-1 wt-% of water. Non-aqueous liquid detergent compositions can contain other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerine, and 1,2-propanediol) can also be used. The compositions may contain from 5 wt-% to 90 wt-%, typically 10 wt-% to 50 wt-% of such carriers. The detergents can also be present as the so-called "unit liquid dose" form.

A further embodiment of the present invention is a fabric softener formulation comprising (a) a shading composition as described above, and (b) at least one fabric softener.

Fabric softeners, especially hydrocarbon fabric softeners, suitable for use herein are selected from the following classes of compounds:

(i) Cationic quaternary ammonium salts. The counter ion of such cationic quaternary ammonium salts may be a halide, such as chloride or bromide, methyl sulphate, or other ions well known in the literature. Preferably the counter ion is methyl sulfate or any alkyl sulfate or any halide, methyl sulfate being most preferred for the dryer-added articles of the invention.

Examples of cationic quaternary ammonium salts include but are not limited to:

(1) Acyclic quaternary ammonium salts having at least two $C_8$ to $C_m$ preferably $O_{12}$ to $O_{22}$ alkyl or alkenyl chains, such as: ditallowedimethyl ammonium methylsulfate, di(hydrogenated tallow)dimethyl ammonium methylsulfate, di(hydrogenated tallow)dimethyl ammonium methylchloride, distearyldimethyl ammonium methyl-sulfate, dicocodimethyl ammonium methylsulfate and the like. It is especially preferred if the fabric softening compound is a water insoluble quaternary ammonium material which comprises a compound having two $C_{12}$ to $C_{18}$ alkyl or alkenyl groups connected to the molecule via at least one ester link. It is more preferred if the quaternary ammonium material has two ester links present. An especially preferred ester-linked quaternary ammonium material for use in the invention can be represented by the formula:

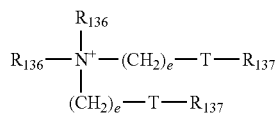

wherein each $R_{136}$ group is independently selected from $C_1$ to $C_4$ alkyl, hydroxyalkyl or $C_2$ to $C_4$ alkenyl groups; T is either —O—C(O)— or —C(O)—O—, and wherein each $R_{137}$ group is independently selected from $C_8$ to $C_{28}$ alkyl or alkenyl groups; and e is an integer from 0 to 5.

A second preferred type of quaternary ammonium material can be represented by the formula:

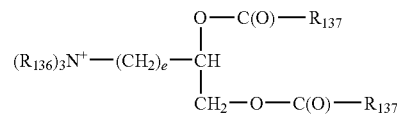

wherein $R_{136}$, e and $R_{137}$ are as defined above.

(2) Cyclic quaternary ammonium salts of the imidazolinium type such as di(hydrogenated tallow)dimethyl imidazolinium methylsulfate, 1-ethylene-bis(2-tallow-1-methyl) imidazolinium methylsulfate and the like;

(3) Diamido quaternary ammonium salts such as: methyl-bis(hydrogenated tallow amidoethyl)-2-hydroxethyl ammonium methyl sulfate, methyl bi(tallowamidoethyl)-2-hydroxypropyl ammonium methylsulfate and the like;

(4) Biodegradable quaternary ammonium salts such as N,N-di(tallowoyl-oxy-ethyl)-N,N-dimethyl ammonium methyl sulfate and N,N-di(tallowoyl-oxy-propyl)-N,N-dimethyl ammonium methyl sulfate. Biodegradable quaternary ammonium salts are described, for example, in U.S. Pat. Nos. 4,137,180, 4,767,547 and 4,789,491 incorporated by reference herein.

Preferred biodegradable quaternary ammonium salts include the biodegradable cationic diester compounds as described in U.S. Pat. No. 4,137,180, herein incorporated by reference.

(ii) Tertiary fatty amines having at least one and preferably two $C_8$ to $C_{30}$ preferably $C_{12}$ to $C_{22}$ alkyl chains. Examples include hardened tallow-di-methylamine and cyclic amines such as 1-(hydrogenated tallow)amidoethyl-2-(hydrogenated tallow) imidazoline. Cyclic amines, which may be employed for the compositions herein, are described in U.S. Pat. No. 4,806,255 incorporated by reference herein.

(iii) Carboxylic acids having 8 to 30 carbons atoms and one carboxylic group per molecule. The alkyl portion has 8 to 30, preferably 12 to 22 carbon atoms. The alkyl portion may be linear or branched, saturated or unsaturated, with linear saturated alkyl preferred. Stearic acid is a preferred fatty acid for use in the composition herein. Examples of these carboxylic acids are commercial grades of stearic acid and palmitic acid, and mixtures thereof, which may contain small amounts of other acids.

(iv) Esters of polyhydric alcohols such as sorbitan esters or glycerol stearate. Sorbitan esters are the condensation products of sorbitol or iso-sorbitol with fatty acids such as stearic acid. Preferred sorbitan esters are monoalkyl. A common example of sorbitan ester is SPAN° 60 (ICI) which is a mixture of sorbitan and isosorbide stearates.

(v) Fatty alcohols, ethoxylated fatty alcohols, alkylphenols, ethoxylated alkylphenols, ethoxylated fatty amines, ethoxylated monoglycerides and ethoxylated diglycerides.

(vi) Mineral oils, and polyols such as polyethylene glycol.

These softeners are more definitively described in U.S. Pat. No. 4,134,838 the disclosure of which is incorporated herein by reference. Preferred fabric softeners for use herein are acyclic quaternary ammonium salts. Mixtures of the above mentioned fabric softeners may also be used.

The fabric softener formulation according to this invention comprises about 0.001-5 wt-%, preferably 0.001-3 wt-%, of the shading composition, based on the total weight of the fabric softener formulation.

The fabric softener formulation employed in the present invention preferably contains about 0.1 to about 95 wt-%, based on the total weight of the fabric softening composition, of the fabric softener formulation. Preferred is an amount of 0.5 to 50 wt-%, especially an amount of 2 to 50 wt-% and most preferably an amount of 2 to 30 wt-%.

The fabric softening composition may also comprise additives which are customary for standard commercial fabric softening compositions, for example alcohols, such as ethanol, n-propanol, i-propanol, polyhydric alcohols, for example glycerol and propylene glycol; amphoteric and nonionic surfactants, for example carboxyl derivatives of imidazole, oxyethylated fatty alcohols, hydrogenated and ethoxylated castor oil, alkyl polyglycosides, for example decyl polyglucose and dodecylpolyglucose, fatty alcohols, fatty acid esters, fatty acids, ethoxylated fatty acid glycerides or fatty acid partial glycerides; also inorganic or organic salts, for example water-soluble potassium, sodium or magnesium salts, non-aqueous solvents, pH buffers, perfumes, dyes, hydrotropic agents, antifoams, anti redeposition agents, enzymes, optical brighteners, antishrink agents, stain removers, germicides, fungicides, dye fixing agents or dye transfer inhibitors (as described in WO-A-02/02865), antioxidants, corrosion inhibitors, wrinkle recovery or wet soiling reduction agent, such as polyorganosiloxanes. The latter two additives are described in WO0125385.

Such additives are preferably used in an amount of 0 to 30 wt-%, based on the total weight of the fabric softening composition. Preferred is an amount of 0 to 20 wt-%, especially an amount of 0 to 10 wt-% and most preferably an amount of 0 to 5 wt-%, based on the total weight of the fabric softening composition.

The fabric softener compositions are preferably in liquid aqueous form. The fabric softener compositions preferably contain a water content of 25 to 90 wt-%, based on the total weight of the composition. More preferably the water content is 50 to 90 wt-%, especially 60 to 90 wt-%.

The fabric softener compositions preferably have a pH value from 2.0 to 9.0, especially 2.0 to 5.0.

The fabric softener compositions can, for example, be prepared as follows:

Firstly, an aqueous formulation of the cationic polymer is prepared as described above. The fabric softener composition according to the invention is usually, but not exclusively, prepared by firstly stirring the active substance, i.e. the hydrocarbon based fabric softening component, in the molten state into water, then, where required, adding further desired additives and, finally, adding the formulation of the cationic polymer. The fabric softener composition can, for example, also be prepared by mixing a preformulated fabric softener with the cationic polymer.

These fabric softener compositions are traditionally prepared as dispersions containing for example up to 30 wt-% of active material in water. They usually have a turbid appearance. However, alternative formulations usually containing actives at levels of 5 to 40 wt-% along with solvents can be prepared as microemulsions, which have a clear appearance (as to the solvents and the formulations see for example U.S. Pat. No. 5,543,067 and WO-A-98/17757).

Another aspect of the invention is the use of a compound as described above for the shading of textile materials.

Yet further aspects of the invention are a compound of formula (A)

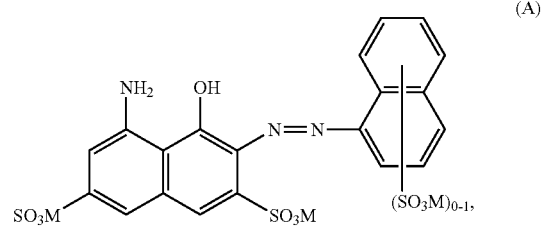

a compound of formula (A1)

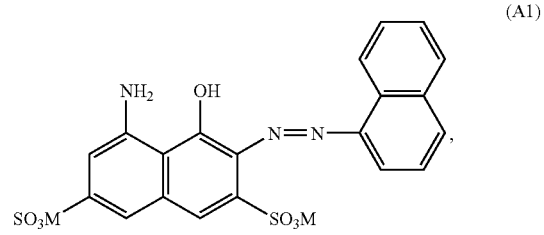

a compound of formula (B1)

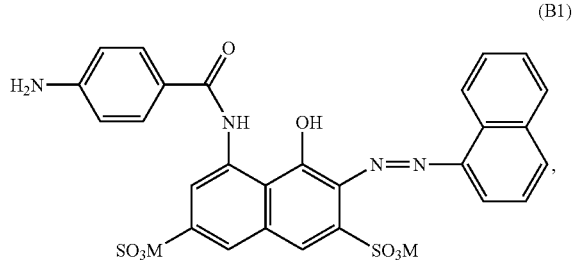

a compound of formula (B2)

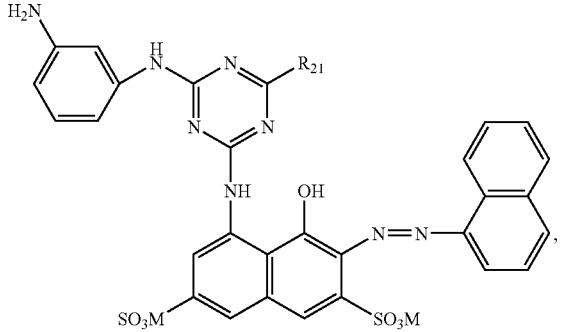

or a compound of formula (B4)

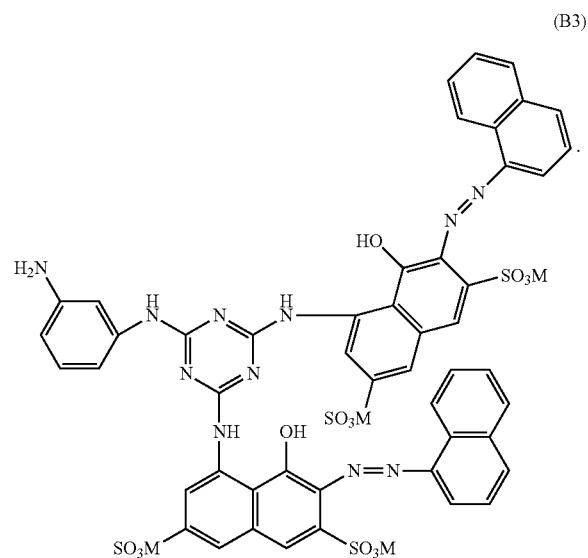

(B3)

wherein M is H or Na. Thus, the compounds may be in the form of the free acids or their corresponding sodium salts. When dissolved in water, the degree of dissociation of the free acids depends on the pH value of the solution.

All definitions and preferences described above apply equally for all aspects of the invention.

The following examples illustrate the invention.
General Procedures

The Zinc phthalocyanine sulfonic acid mixture with at least one sulfonylchloride group is prepared starting from unsubstituted Zinc phthalocyanine. The first possibility is to sulfonate unsubstituted Zinc phthalocyanine. The degree of sulfonation can be adjusted by the sulfonation time and the appropriate sulfonation temperature. Normally, the corresponding Zinc phthalocyanine sulfonic acid sodium salt is isolated. The Zinc phthalocyanine sulfonic acid derivative is activated to a Zinc phthalocyanine sulfonylchloride derivative.

The synthesis of a Zinc phthalocyanine sulfonic acid mixture is also possible by direct activation of dried solid Zinc phthalocyanine sulfonic acid mixtures prepared according to literature procedures.

1a) Synthesis of a Zinc phthalocyanine sulfonic acid mixture with at least one active sulfonyl chloride starting from Zinc phthalocyanine A mixture of 16.55 ml (31.4 g) fuming sulfuric acid (20% free $SO_3$) and 12.8 ml (24.8 g) fuming sulfuric acid (65% free $SO_3$) is stirred at 20° C. Into this solution, 12.5 g (0.0195 mol) Zinc phthalocyanine (90% active) is added within 5-10 minutes. The reaction mixture is heated to 75° C. and kept for 30 minutes at that temperature. Then the reaction mixture is poured within 10 minutes into 330 g of a mixture of ice and water. With sodium hydroxide (32% G/G) pH 7 is adjusted while the temperature of the solution is kept below 25° C. The crude Zinc phthalocyanine sulfonic acid is desalted by dialysis and freeze-dried. Yield: 13 g. 1.5 g of this dry mixture is suspended in 14.94 g (0.128 mol) chlorosulfuric acid. The reaction mixture is heated to 87° C. and kept for 30 minutes.

Within 45 minutes, 1.05 ml (1.72 g, 0.014 mol) thionyl chloride is added dropwise. The reaction mixture is kept at 87° C. for two more hours. Then the solution is allowed to cool down to 30° C. and poured within 10 minutes into 25 g of an ice/water mixture. The temperature of the solution is kept between 0-5° C. by further addition of ice. The formed precipitate is filtered off and washed with sodium chloride solution (3%)

A mixture of bis- and tris-sulfonated Zinc phthalocyanine isomers is obtained (DS=2-3). Hence, the raw material is mainly a mixture of different Zinc phthalocyanine bis-sulfonic acid-mono-sulfonylchloride/Zinc phthalocyanine monosulfonic acid-monosulfonylchloride (1 active $SO_2Cl$ group) and Zinc phthalocyanine monosulfonic acid bis-sulfonylchloride/Zinc phthalocyanine bis-sulfonylchloride (2 active $SO_2Cl$) derivatives. The sulfonation of the Zinc phthalocyanine can also be performed with chlorosulfuric acid.

1b) Synthesis of a Zinc Phthalocyanine Sulfonic Acid Mixture with at Least One Active Sulfonyl Chloride The Zinc phthalocyanine tetrasulfonic acid sodium salt is a mixture of different isomers with an average degree of sulfonation about 3.6-3.8. It can be obtained by a sulfonation procedure of the unsubstituted Zinc phthalocyanine according to known procedures. The main components are various isomers of tetrasulfonated and trisulfonated Zinc phthalocyanines. Before the reaction the material must be dried by lyophilization or spray drying. The dried Zinc phthalocyanine tetrasulfonic acid sodium salt (3.6 mmol) is slowly added under stirring to chlorosulfuric acid (117.4 mmol) at room temperature. The reaction mixture is heated to 85-90° C. for 30 minutes and stirred for 1.5 hours. During 90 minutes at this temperature thionyl chloride (28.6 mmol) is added dropwise. Stirring is continued for another 2 hours at 87° C. The reaction mixture is cooled down to room temperature and added to an excess of ice. The formed green precipitate is filtered off and washed with aqueous sodium chloride (3%). The green intermediate is directly used for the next reaction step. The raw material is mainly a mixture of Zinc phthalocyanine tris(sulfonic acid) monosulfonylchloride/Zinc phthalocyanine bis(sulfonic acid)monosulfonylchloride (1 active $SO_2Cl$ group) and Zinc phthalocyanine bis(sulfonic acid) bis-sulfonyl-chloride/Zinc phthalocyanine monosulfonic acid bis-sulfonylchloride (2 active $SO_2Cl$) derivatives.

2) Synthesis of a Zinc Phthalocyanine Dye Conjugate

The crude moist Zinc phthalocyanine sulfonylchloride prepared from 0.0195 mol Zinc phthalocyanine in 1a) is dissolved in ice-cold water and an aqueous solution (0.0195 mol) of the corresponding dye is added within 5 minutes. The reaction mixture is adjusted to pH 7 with sodium hydroxide (32%). The reaction mixture is heated to 50° C. and stirred for 2 hours, afterwards cooled down to 25° C. and stirred another eight hours. During the reaction time, the reaction mixture is automatically maintained at pH 7 with sodium hydroxide (32%). The reaction is monitored by TLC (solvent pyridine 25 ml/N,N-diethylamine 33 ml/3-methylbutanol 17 ml/aqueous ammonia (25%) 25 ml) or by LC (solvent 1 water/borax buffer pH=10, TBAHS, solvent 2 methanol/TBHAS with a Zorbax column Eclipse XDB-Phenyl. The reaction mixture is worked-up when the coupling reaction is complete and no more free unbound dye is detected.

Work-up and purification:

The reaction mixture is desalted by dialysis (cellulose tubes, MWCO 12.000-14.000, 45 mm*vol/cm: 6.42, wall thickness: 20 μm) or by nanofiltration through a suitable membrane. The desalted reaction solution contains the isomeric mixtures of covalently linked sulfonated Zinc phthalocyanine dye conjugates and tetrasulfonated Zinc phthalocyanine as by-product. The obtained blue solution can be directly used for the synthesis of liquid or solid formulations.

A solid Zinc phthalocyanine dye conjugate can be obtained by lyophilization of the desalted solution.

Because there are numerous possible isomers with regard to the position of the sulfonic acid group and the sulfonamide linkage, only general structures are given. The sulfonic acid function can exist in the free acid form or as in the sodium salt form or as a mixture thereof.

EXAMPLE A1

Synthesis of a Zinc Phthalocyanine Monoazo Dye Conjugate a) Synthesis of a Zinc Phthalocyanine Sulfonyl Chloride Derivative

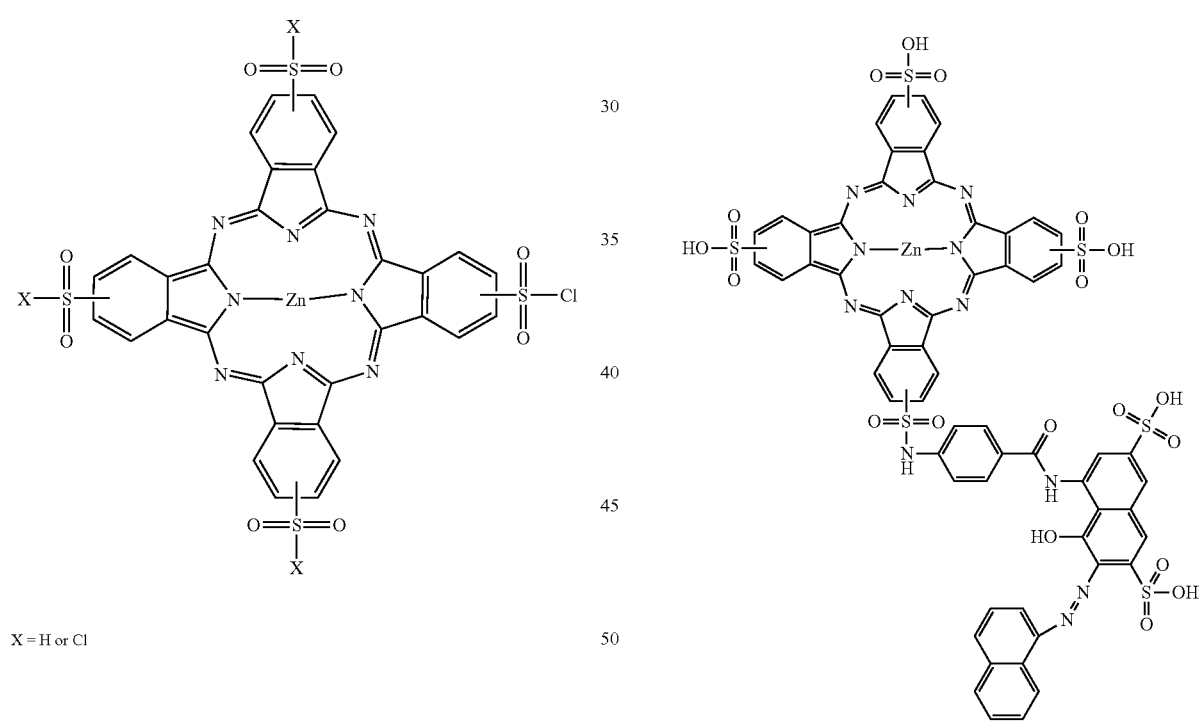

X = H or Cl 2.0 g Zinc phthalocyanine tetrasulfonic acid sodium salt, 15 ml chlorosulfuric acid and 2.6 ml of thionyl chloride are reacted as given in the general procedure 1b). The reaction mixture is given onto 50 g ice. The precipitate is isolated as described above and directly used for further reactions.

b) Preparation of the Monoazo Dye:

I) Preparation of the coupling component: 0.05 mol of N-(4-aminobenzoyl)-H-acid are suspended in 100 ml water and adjusted to pH 7.5 with aqueous solution of 30% sodium hydroxide.

II) Suspension and diazotization of 1-aminonaphthalene: 7.14 g (0.05 mol) 1-aminonaphthalene is suspended in a mixture of 100 ml water and 5 ml hydrochloric acid (32%). The temperature of this suspension is increased to 30° C. until a solution is formed. Again 12 ml of hydrochloric acid (32%) is added. Afterwards the solution is cooled down to 0° C. with 120 g of ice. 11 ml of 4N sodium nitrite solution is added slowly over the course of 15 minutes. During the addition, the temperature of the solution must be kept below 4° C. Sulfamic acid (1M) is added to the solution to destroy the excess sodium nitrite. 0.05 mol reaction solution are obtained.

III) Coupling: A solution of 0.05 mol of the coupling component prepared in I) is cooled down to 0° C. To that solution the 0.05 mol diazo suspension prepared in II) is added over the course of 30 minutes. Simultaneously, a pH of 7.5 and a temperature between 0-5° C. is adjusted with an aqueous (20%) solution of sodium carbonate. A violet suspension is obtained. Reaction monitoring is done by LC. When the reaction is complete, the raw dye solution is desalted in a dialysis tube at pH 8.5 and lyophilized.

Yield: 48.2 g, $UV_{vis}$ $\lambda_{max}$ 548 nm.

c) Synthesis of the Zinc Phthalocyanine Dye Conjugate 815 mg Zinc phthalocyanine monosulfonyl chloride from example A1a) are suspended in 40 ml water at 0° C. A solution of 527 mg dye in 30 ml distilled water is added dropwise. The reaction mixture is reacted, worked-up, desalted and dried according to general procedure 2).

The product is obtained as a dark blue solid.

The characterization was done by $UV_{vis}$-spectroscopy ($\lambda$ 540 and $\lambda_{max}$ 672 nm) and MS.

The assignments of the detected structures are given in the following table.
| Molecular weight (g/mol) | structure |
|---|---|
| 896 | 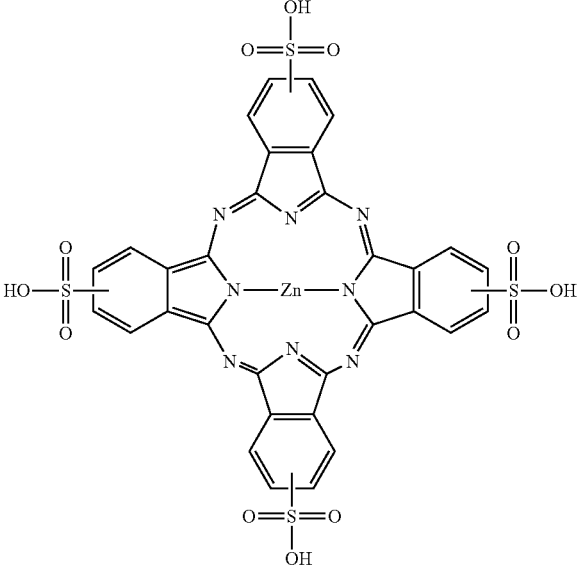 |
| 1470 | 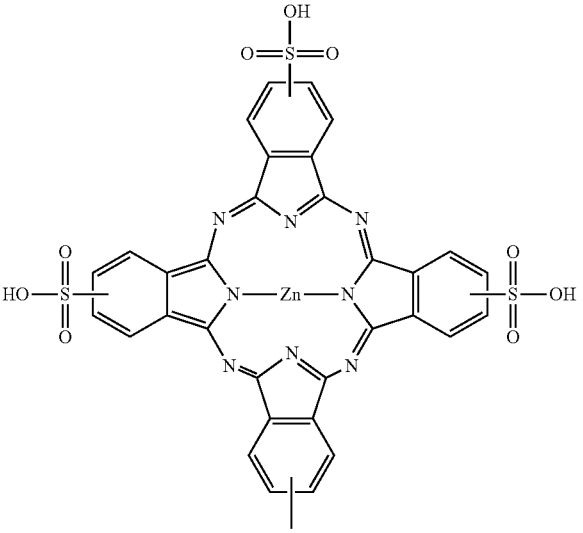 |

| Molecular weight (g/mol) | structure |
|---|---|
|  | 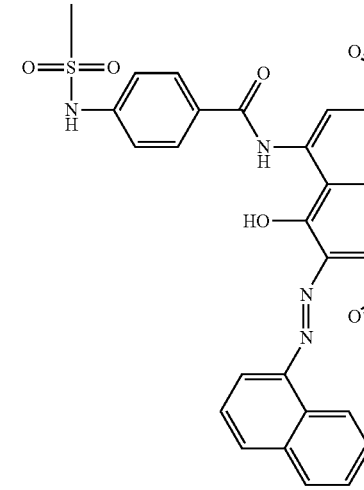 |
| 816 | 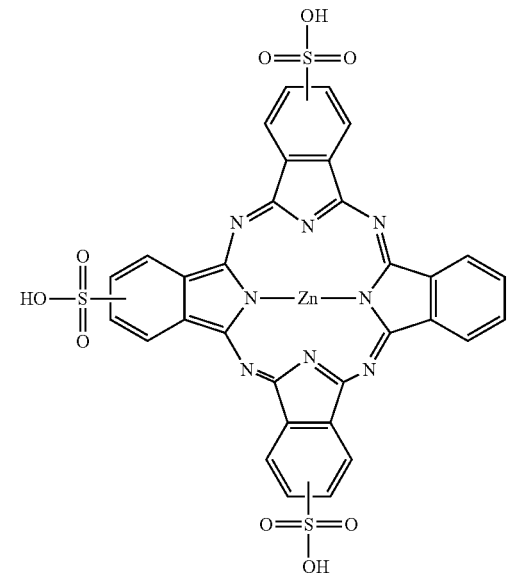 |
| 1390 | 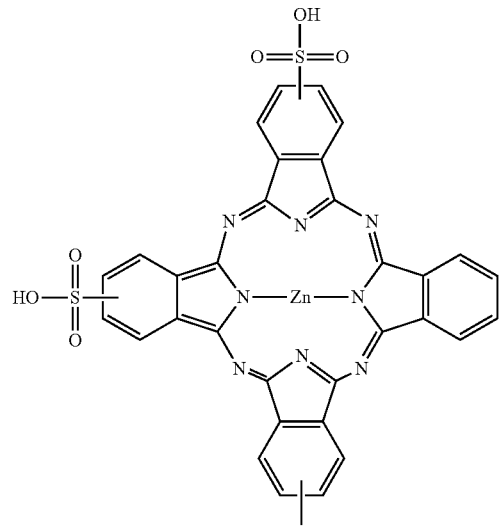 |

| Molecular weight (g/mol) | structure |
|---|---|
| | 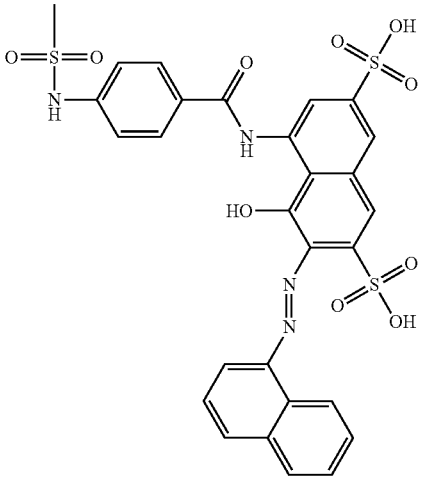 |

EXAMPLE A2

Synthesis of a Zinc Phthalocyanine Monoazo Triazine Dye Conjugate

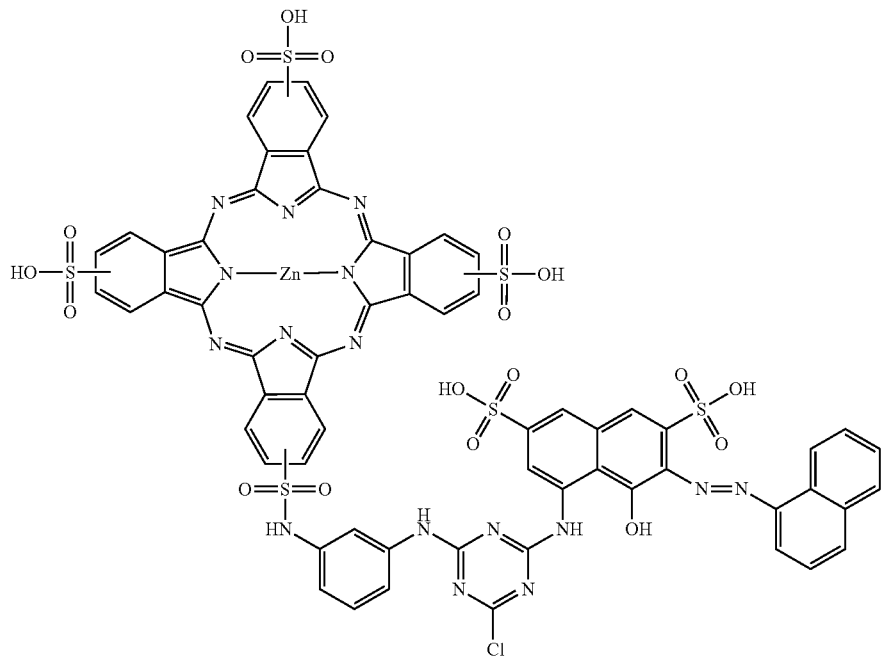

a) Preparation of the monoazo triazine dye

I) Synthesis of the monoazo intermediate. The monoazo 1-naphthylamine-diazo to H-acid is prepared by diazotization of commercially available 1-aminonaphthalene, coupling to acetylated H-acid and finally, alkaline hydrolysis.

Acetylation of H-acid: 191.9 g (0.5 mol) H-acid (83%) is suspended in 500 ml water and dissolved at pH 7 by the addition of 48.6 ml aqueous NaOH (30%). 92.1 g acetic acid anhydride is slowly added over the course of 10 minutes. The reaction solution is cooled to 10° C. by the addition of 250 g ice; with 118.3 ml aqueous NaOH (30%) a pH of 7 is adjusted. Further 56.2 ml aqueous NaOH (30%) is added. A pH value of 10.5 is maintained for 1 hour at a temperature of 30° C. by the addition of 4.8 ml NaOH (30%). By addition of 32.9 ml aqueous HCl (32%), the solution is adjusted to a pH value of 7.2. The solution is cooled to 20° C. with 180 g ice. The reaction solution has a weight of 1594 g containing 0.5 mol of acetylated H-acid.

Suspension and diazotation of 1-naphthylamine: In a mixture of 800 ml water and 40.0 ml aqueous HCl (32%) is added—under stirring—57.3 g (0.4 mol) 1-naphthylamine as a melt. 97.2 ml HCl (32%) are added and the reaction solution is cooled to 0° C. with 530 g ice. Over the course of 15 minutes, 90 ml of sodium nitrite solution (4N) is added. During the addition, the temperature must not exceed 4° C. After further addition of 11 ml of sodium nitrite solution, the reaction mixture is stirred for 30 minutes. 1 mol of sulfamic acid is added to destroy an excess of nitrite.

Coupling: 1275 g (0.4 mol) of the acetylated H-acid (pH 4.8) is poured over the course of 1 minute into the prepared diazo-suspension. A pH value of 7.5 is adjusted with 327 ml of sodium carbonate solution (20% G/V). The solution is stirred at room temperature for 12 hours. Total volume of reaction solution is around 3.4 liters.

Saponification: 340 ml NaOH (30%) is given to this reaction mixture. The reaction mixture is heated to 90° C. and kept at this temperature for 3 hours. By the addition of 292.5 ml HCl (32%) a pH value of 7.5 is adjusted. The violet suspension is stirred at room temperature for 12 hours. The volume of the reactions solution is around 4 liters. The formed precipitate is filtered off. 518.7 g of paste is obtained. Yield: 84.4% (determined by titration with sodium nitrite).

II) first condensation: A suspension consisting of 14.23 g cyanuric chloride, 40 ml of water, 20 g of ice and 0.4 g of disodium hydrogen tetraoxophosphate is prepared. Under stirring another 60 grams of ice are added. The reaction suspension is adjusted to pH=3.5 with hydrochloric acid. 1080.8 g of an aqueous solution containing 0.0735 mol monoazo intermediate is added over the course of 15 minutes to the reaction suspension. The reaction temperature during the addition is kept between 0-5° C. by addition of ice. Simultaneously pH 3.5 is adjusted with an aqueous solution (30%) of sodium hydroxide. The reaction mixture is stirred for another hour at 0-5° C. at pH=4. Afterwards, the reaction mixture is allowed to reach room temperature. The resulting reaction mixture has a weight of 1677.7 g containing 0.0735 mol.

III) second condensation: A solution of 4.02 g (0.0222 mol) m-phenylenediamine dihydrochloride in 25 ml water is poured over the course of one minute to 0.022 mol of the first condensation intermediate prepared according to II). By portionwise addition of 30% aqueous sodium hydroxide solution, a pH value of 5 is maintained. The reaction is stirred at room temperature for 12 hours. The solution is desalted in a dialysis tube and lyophilized.

b) Synthesis of the Zinc phthalocyanine dye conjugate: 800 mg Zinc phthalocyanine monosulfonyl chloride from example 1a) is suspended into 15 ml of water at 0° C. and tretated, reacted and worked-up as described in the general procedure 2. The product is obtained as a dark-blue solid.

The characterization was done by UV$_{vis}$-spectroscopy ($\lambda$ 540 nm and $\lambda_{max}$ 670 nm) and MS. The assignments of the detected structures are given in the following table.

| Molecular weight (g/mol) | structure |
|---|---|
| 896 | 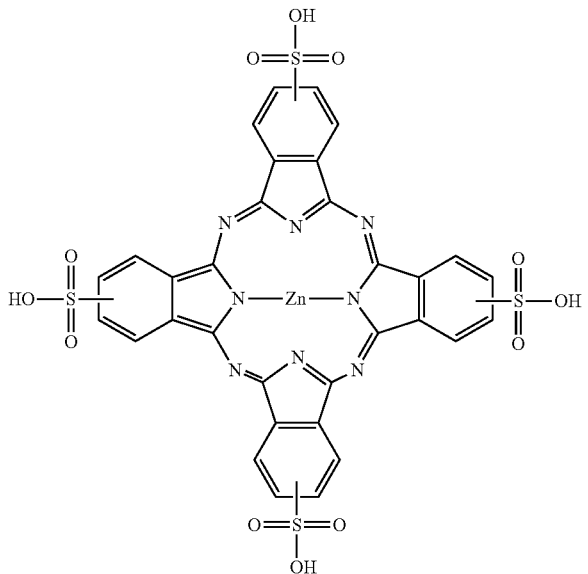 |

-continued
| Molecular weight (g/mol) | structure |
|---|---|
| 1570 | 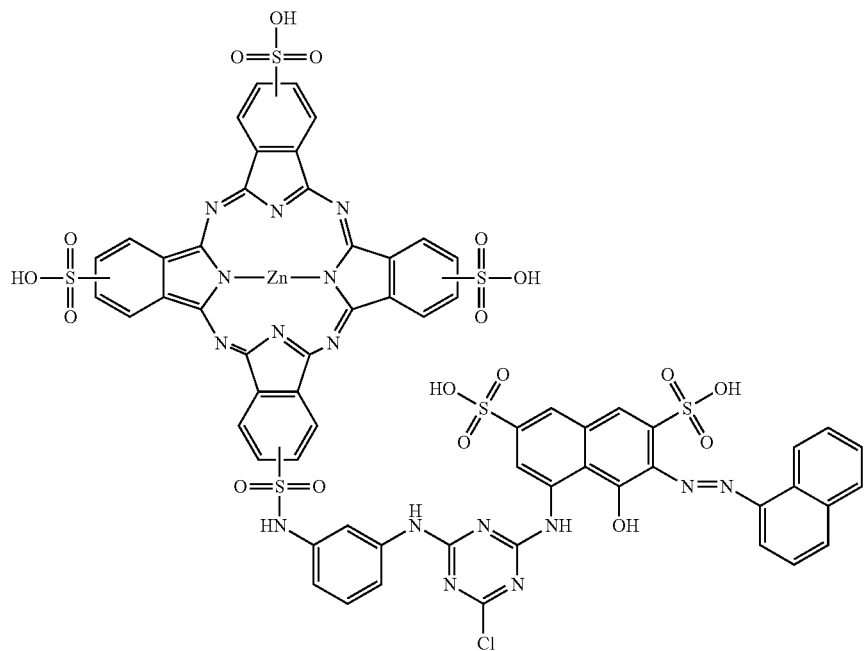 |
| 816 | 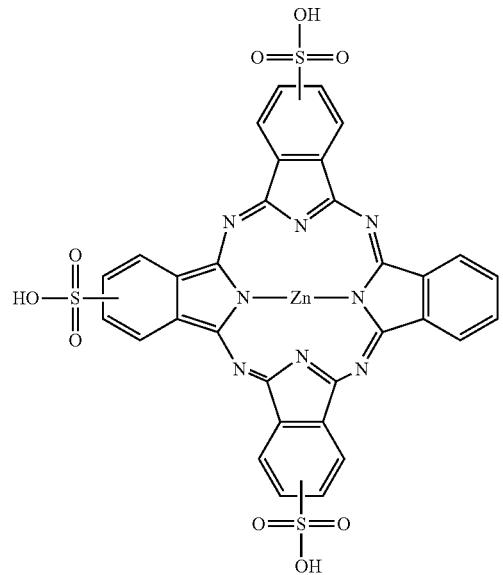 |

-continued
| Molecular weight (g/mol) | structure |
|---|---|
| 2244 | 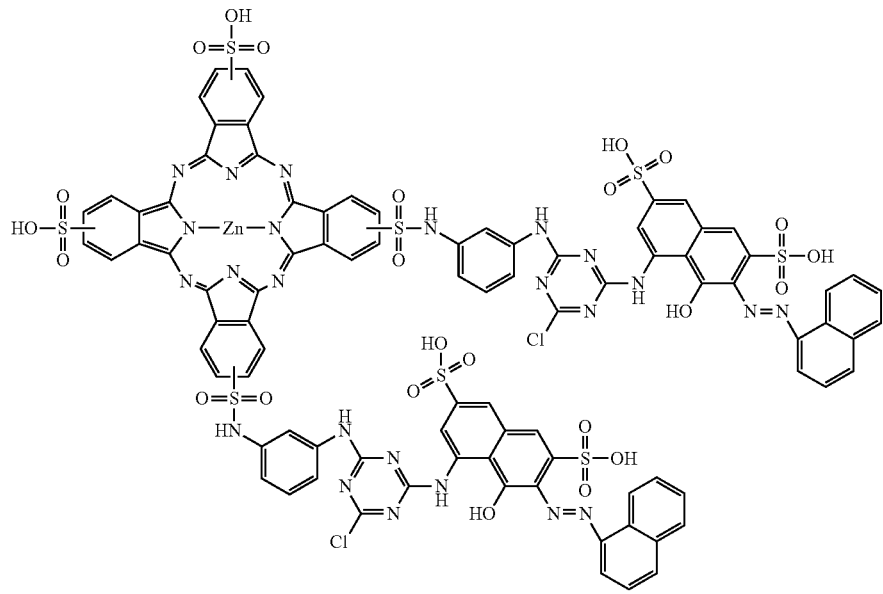 |
| 1490 | 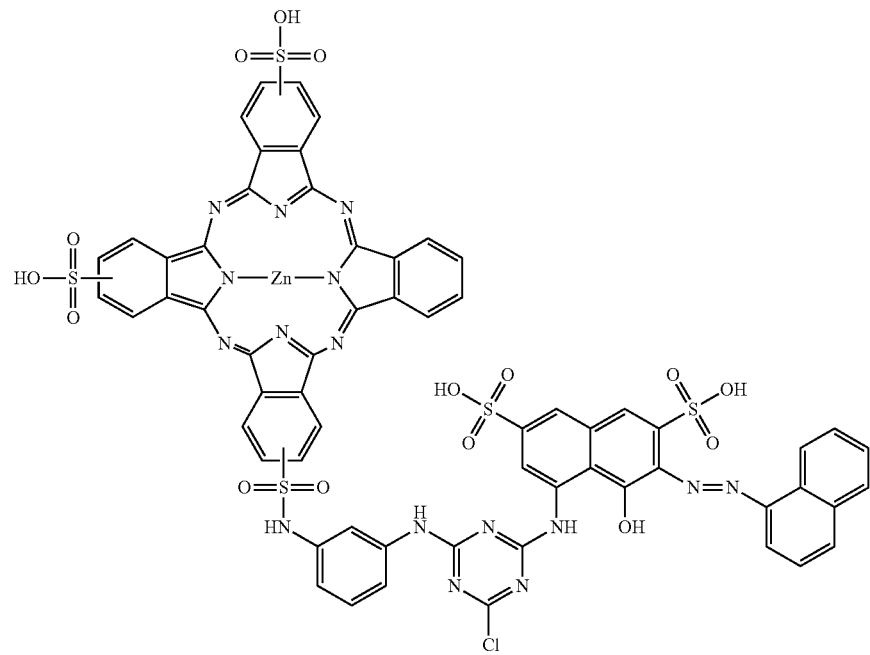 |

In the above structural formulas the sulfonation of the PC rings indicates the isomeric structures, which are obtained. The above representation includes, therefore, all possible structural isomers.

EXAMPLE A3

Synthesis of a Zinc Phthalocyanine Bis(Monoazo) Triazine Dye Conjugate

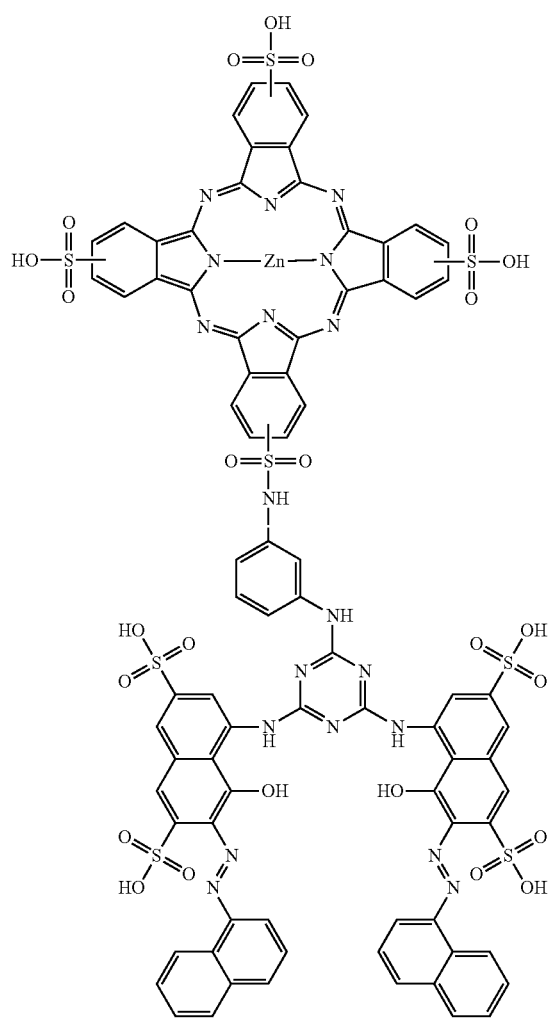

a) Preparation of the bis(monoazo)-triazine dye

This dye can be prepared following two different synthetic procedures:

1) The Monoazo, 1-Naphthylamine-diazo to H-acid, is synthesized according to the procedure given in example A2. Afterwards 2 mole-equivalents of the monoazo are condensed to 1 mole-equivalent of cyanuric chloride, the last condensation is done with 1 mole-equivalent of m-phenylenediamine.

I) An aqueous solution of 0.060 mol 5-amino-4-hydroxy-3(naphthalen-1-ylazo)-naphthalene-2,7-disulfonic acid was stirred at room temperature. A suspension consisting of 100 ml of ice water, 0.1 g disodium hydrogen tetraoxophosphate and 5.53 g (0.03 mol) cyanuric chloride is added to the intermediate. The reaction mixture is adjusted and kept with aqueous sodium hydroxide solution (30%) at pH 7. After 30 minutes the reaction mixture is heated to 70° C. and pH 7 is kept for several hours until the reaction is completed (reaction is monitored by LC). The obtained product solution is used for the third condensation step. II) To a solution of 0.030 mol of intermediate prepared according to I) is added a solution of 5.59 g (0.0031 mol) m-phenylenediamine in 50 ml water. The reaction mixture is heated to 95° C. and a pH value of 8.5 is kept by addition of aqueous 30% sodium hydroxide solution. The reaction is monitored by LC. After 3 hours the reaction mixture is cooled to room temperature, a volume of 950 ml solution is obtained. For isolation of the product, 237.5 g solid sodium chloride is added. The reaction mixture is stirred for another 12 hours. The formed precipitate is filtered off and dried.

Yield: 42.2 g, $UV_{vis}$ $\lambda_{max}$ 536 nm.

2) The same dye can also be obtained by a twofold condensation of H-acid to cyanuric chloride, coupling of this intermediate with 2.6 molequivalents of 1-aminonaphthalene-diazo (=30% excess) and subsequent condensation with 1,3-phenylenediamine.

b) Synthesis of a Zinc phthalocyanine bis(monoazo) triazine dye conjugate

A suspension of 800 mg Zinc phthalocyanine monosulfonyl chloride from example A1a in 20 ml ice water is treated with the bis(monoazo) triazine dye prepared above. The reaction and work-up is done according to the general procedure 2.

The characterization was done by $UV_{vis}$-spectroscopy ($\lambda$ 540 nm and $\lambda_{max}$ 670 nm) and MS. The assignments of the detected structures are given in the following table.

| Molecular weight (g/mol) | structure |
|---|---|
| 896 | 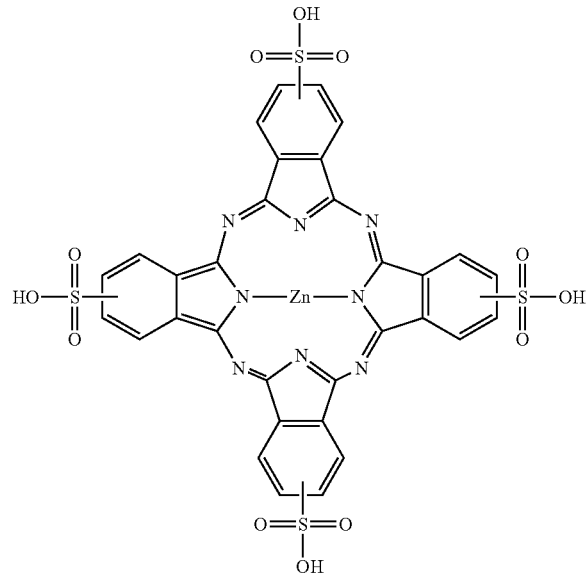 |
| 2007 | 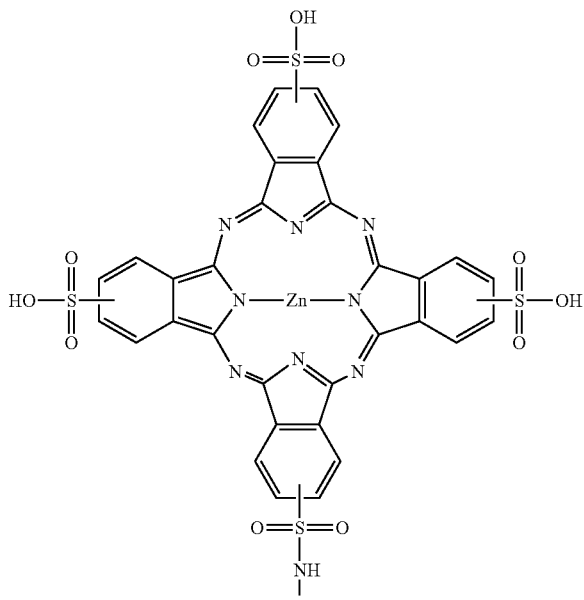 |

-continued
| Molecular weight (g/mol) | structure |
|---|---|
| | 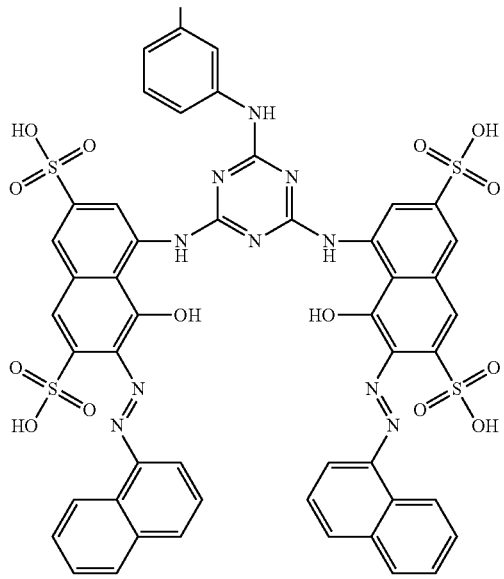 |
| 816 | 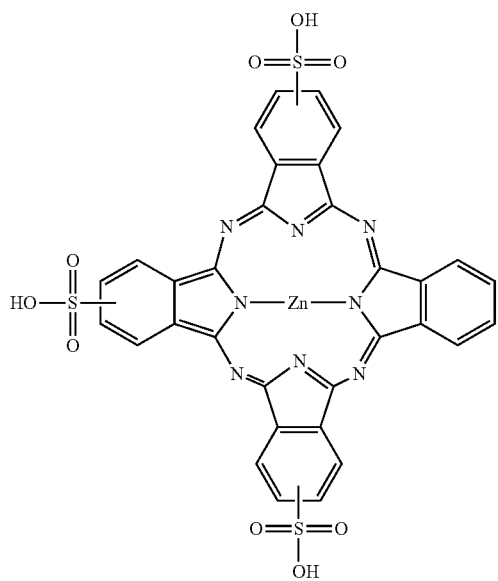 |

-continued
| Molecular weight (g/mol) | structure |
|---|---|
| 1927 | 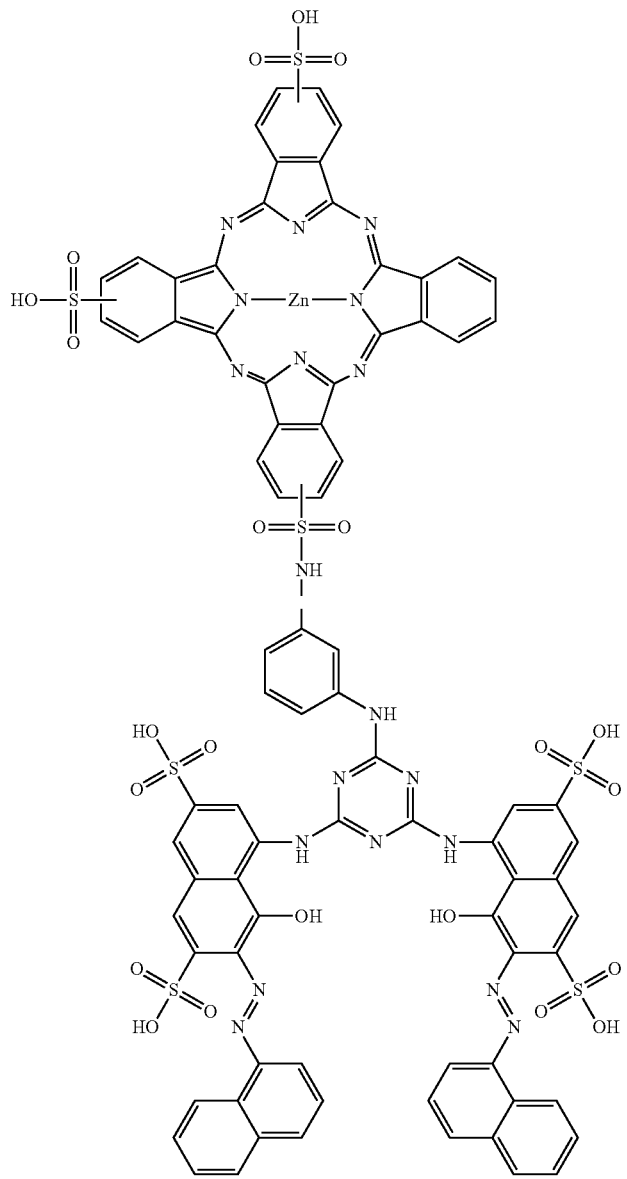 |

In the above structural formulas the sulfonation of the PC rings indicates the isomeric structures, which are obtained. The above representation includes, therefore, all possible structural isomers.

EXAMPLE A3b

Synthesis of a Zinc Phthalocyanine Bis(Monoazo) Triazine Dye Conjugate

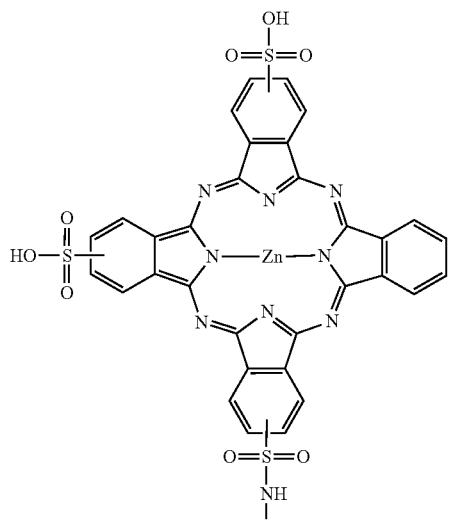

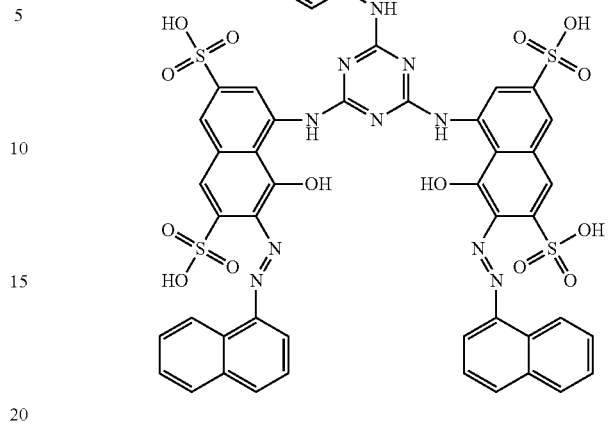

1.5 g Zinc phthalocyanine, 8.8 ml (14.9 g) chlorosulfuric acid and 1.0 ml (1.7 g) of thionyl chloride are reacted as given in the general procedure 1a). The reaction mixture is given onto 25 g ice. The temperature is kept between 0-5° C. by addition of 140 g of ice. The precipitate is isolated as described in general procedure 1a) and directly further reacted. The crude Zinc phthalocyanine sulfonylchloride is suspended in 50 ml of a mixture of ice and water. Within 5 minutes, a solution of an equimolar amount of bis(monoazo) triazine dye prepared above is added. The reaction mixture is reacted and worked up by dialysis and dried by lyophilization according to general procedure 2).

The characterization is done by $UV_{vis}$-spectroscopy ($\lambda$ 540 nm and $\lambda_{max}$ 670 nm) and MS. The assignments of the detected structures are given in the following table:

| Molecular weight (g/mol) | structure |
|---|---|
| 736 | 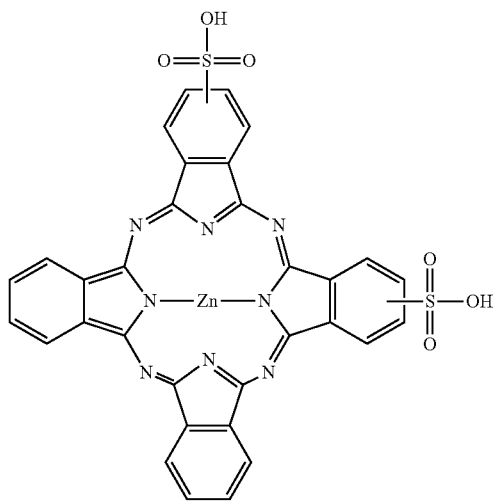 |

-continued
| Molecular weight (g/mol) | structure |
|---|---|
| 816 | 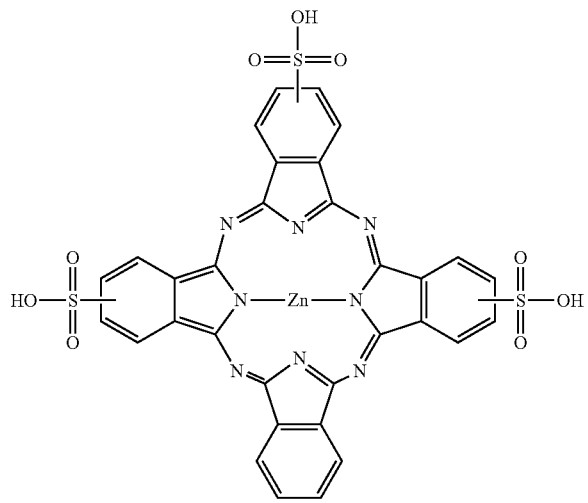 |
| 1191 | 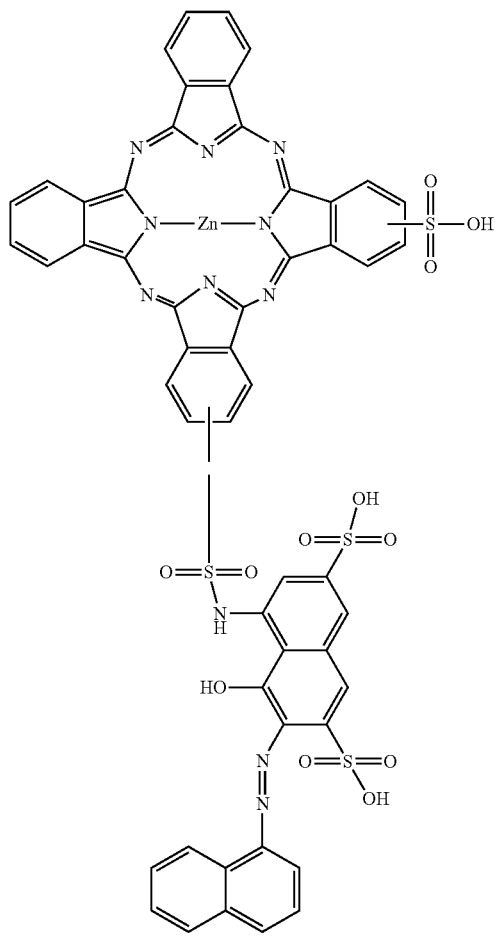 |

| Molecular weight (g/mol) | structure |
|---|---|
| 1847 | 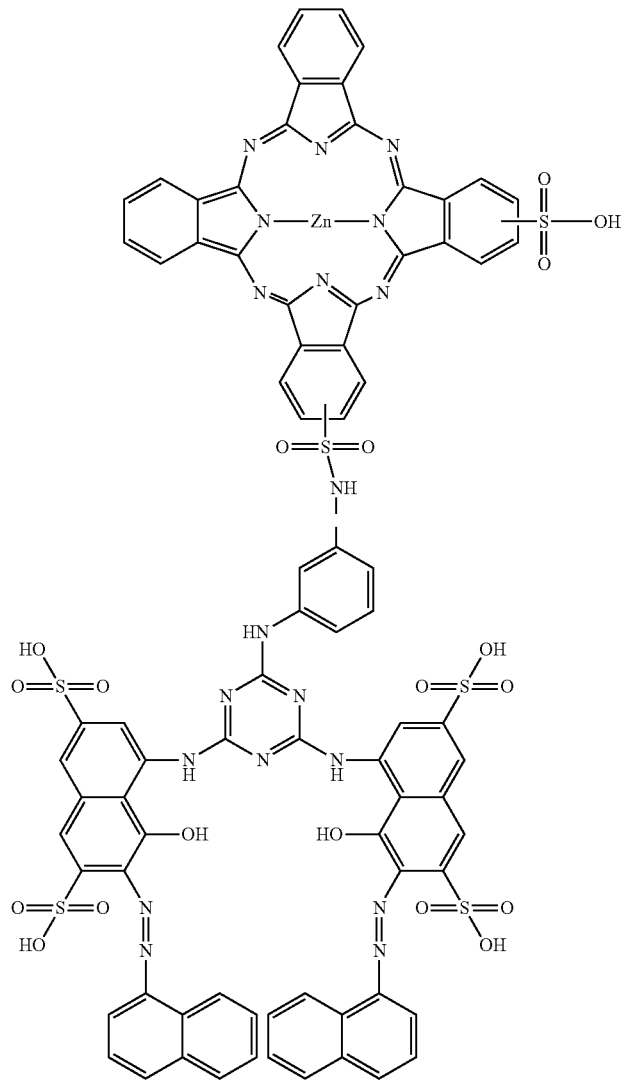 |

-continued
| Molecular weight (g/mol) | structure |
|---|---|
| 1927 | 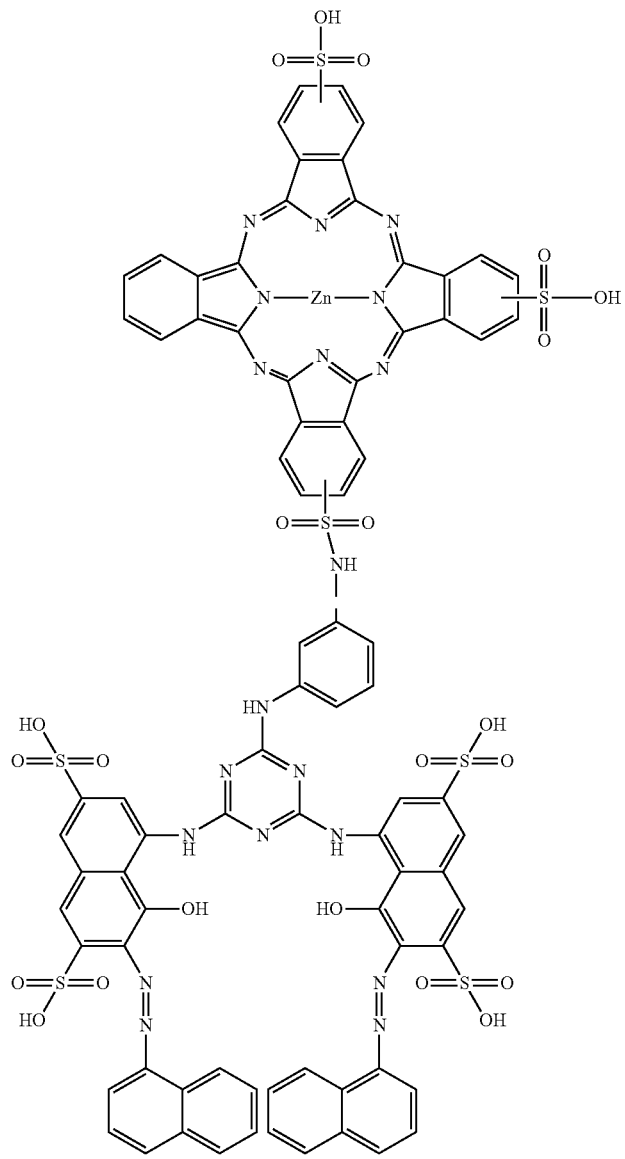 |
| 2958 | 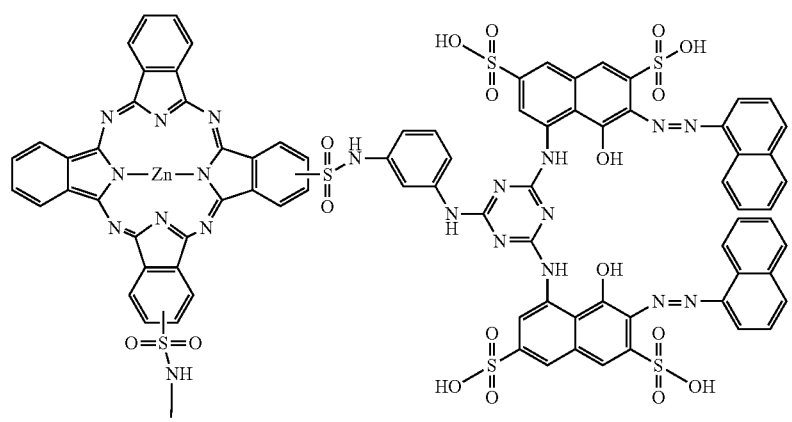 |

| Molecular weight (g/mol) | structure |
|---|---|
|  | 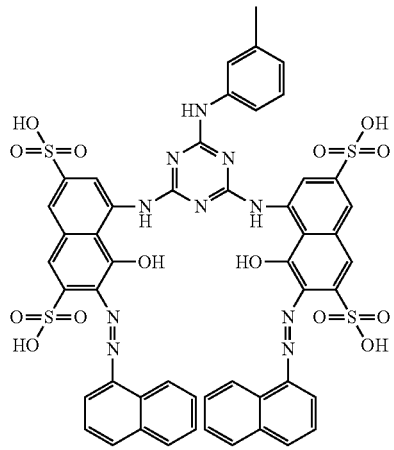 |
| 3038 | 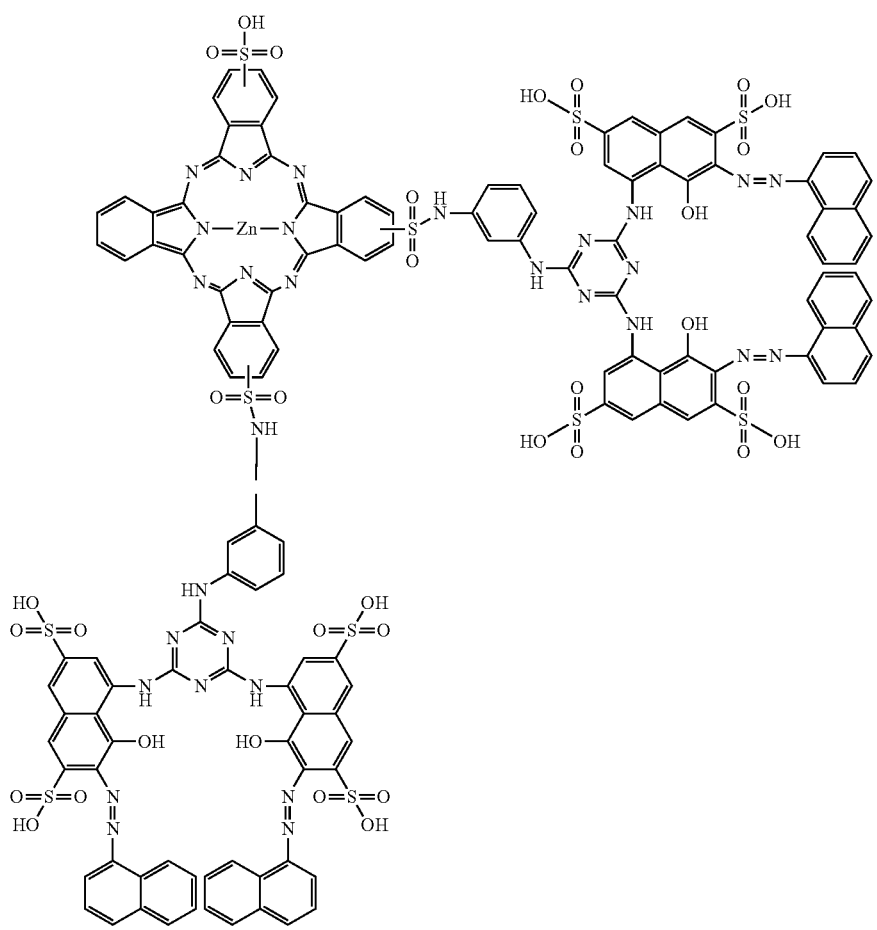 |

EXAMPLE A4

Synthesis of a Zinc Phthalocyanine Bis(Monoazo) Triazine Dye Conjugate b) Synthesis of a Zinc phthalocyanine 4-tetrasulfonic acid mono sulfonyl chloride derivative

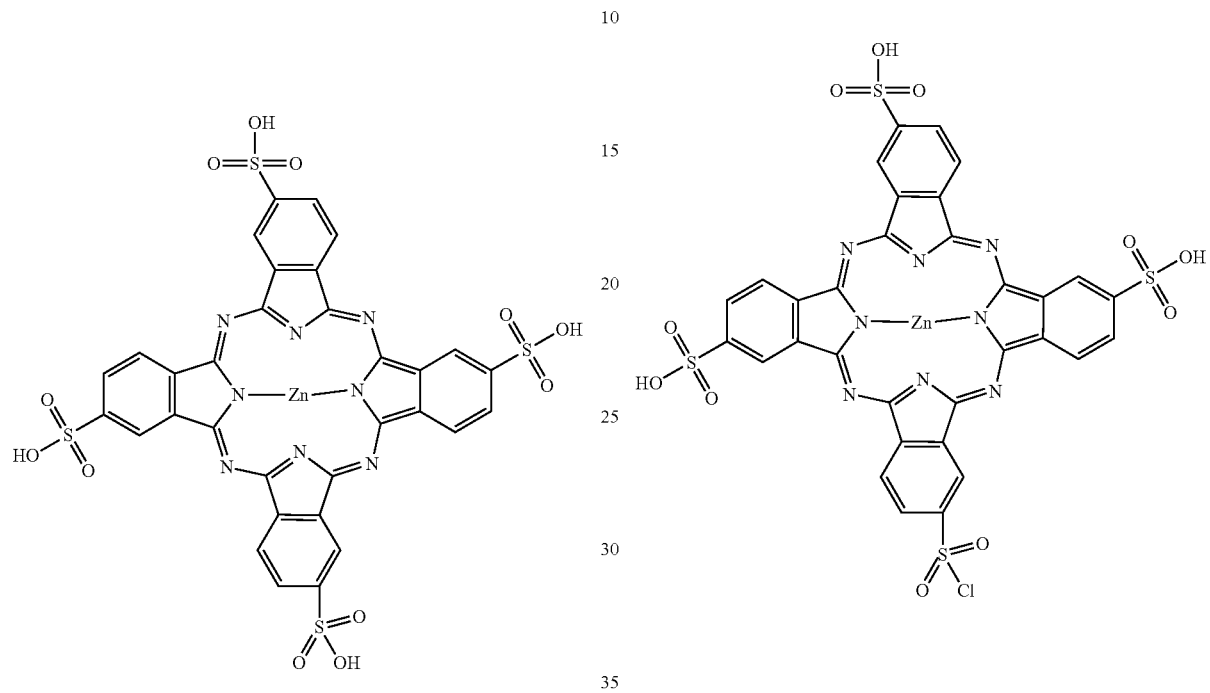

a) Synthesis of a Zinc phthalocyanine 4-tetrasulfonic acid derivative 15 g of 50 wt. % solution of 4-sulfophthalic acid (30.5 mmol), 2 g (9.11 mmol) of Zinc acetate, 0.2 g (1.02 mmol) of ammonium molybdate and 5 ml of distilled water are stirred together until all of the solids are dissolved. 20 g (333 mmol) of urea are added to this solution and the mixture is stirred until most of the urea was dissolved. This reaction mixture is poured into a reactor.

The reaction mixture is heated to 180° C. for one hour. The temperature is then raised to 225° C. and maintained at that temperature for five hours. After cooling to room temperature, the product is isolated and characterized by UV spectroscopy.

Yield: 11-12 g (crude).

The purity is checked by $UV_{vis}$ spectroscopy, $\lambda_{max}$: 669 nm, ϵ: 25.000-35.000.

The crude sample is purified by methanol treatment and dialysis.

Yield: ~2 g, $\lambda_{max}$: 669 nm, ϵ: 120.000-139.000.

In contrast to the sulfonated Zinc phthalocyanines described in examples 1-3, this phthalocyanine is exclusively sulfonated at the position 4 or 5.

The Zinc phthalocyanine 4-tetrasulfonic acid obtained according to the procedure in example A4a) is transformed to the Zinc monosulfonyl chloride according to the general procedure 1b.

c) Synthesis of a Zinc phthalocyanine monoazo dye conjugate

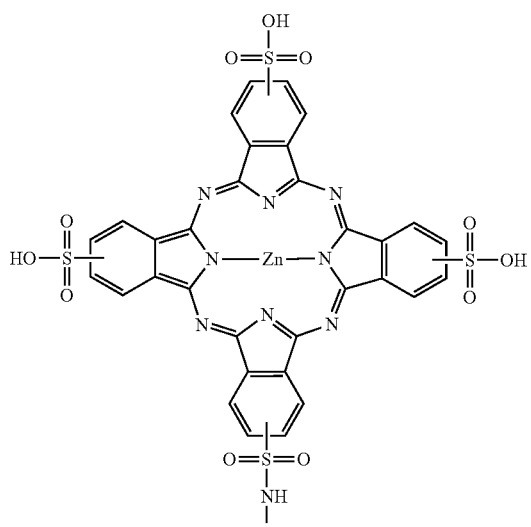

-continued

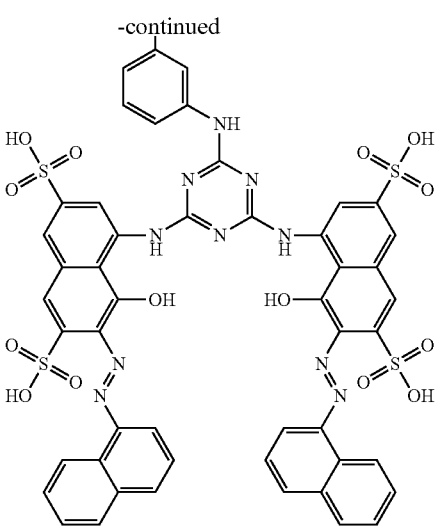

The wet cake of the Zinc phthalocyanine sulfonyl chloride of example A4b) is suspended in water and the pH is adjusted to 7 by adding 0.1N NaOH solution. This is then added to an aqueous solution of the monoazo described in example A3. The mixture is reacted, and worked-up according to the general procedure 2).

APPLICATION EXAMPLES

A bleached cotton fabric is treated with an aqueous solution of the compounds described in the preparation examples A1-3. By this treatment, all fabrics are blue to violet colored. The fabrics are exposed in a wet state for up to 120 min. to a tungsten lamp. The intensity of the blue/violet color of the fabric is continuously reduced upon exposure.

Washing Experiments

Bleached cotton is washed with a detergent containing photocatalysts from example A1-A3 for 15 min at 30° C. The amount of photocatalyst is 0.04% by weight based on the weight of the detergent. The amount of dye given in Table 1, examples 1-3 is based on an initially equal dye-strength as measured by the absorption at 670 nm.

Detergent 40 gr/kg of fabric
Fabric to Liquor ratio 1:10

After washing one part of the fabrics they are exposed to tungsten light for two hours (light intensity, as measured with a Roline RO-1322 Digital Lux meter at the position of the fabric, is within the range of 17000 Lux). One part is dried in the dark. This washing cycle is repeated four times. After the fourth cycle the amount of dye on the fabric dried in the dark and on the fabric dried under exposure is determined, using the Kubelka-Munck formula K/S. The amount of dye on the fabric dried under exposure is given (Table 1) as percentage of the amount of dye that is determined on the fabric dried in the dark. The lower the percentage the more dye is degraded during light exposure.

TABLE 1

| Examples | % dye remaining |
|---|---|
| Example B1 (compound of example A1) | 50% |
| Example B2 (compound of example A2) | 69% |
| Example B3 (compound of example A3) | 45% |
| Example B4 (compound of example A3b) | 54% |

The invention claimed is:
1. A phthalocyanine compound of formula (1)

$$(PC)\text{-}L\text{-}(D) \qquad (1)$$

in which at least one mono-azo dyestuff is attached through covalent bonding via a linking group L to a metal-containing phthalocyanine ring system wherein
the metal (Me) is Zn, Ca, Mg, Na, K, Al, Si, Ti, Ge, Ga, Zr, In or Sn;
PC is a metal-containing phthalocyanine ring system;
D is a radical of a mono-azo dyestuff;
wherein each D is independently from each other a dyestuff radical of formulae Xa, Xb, Xc or Xd

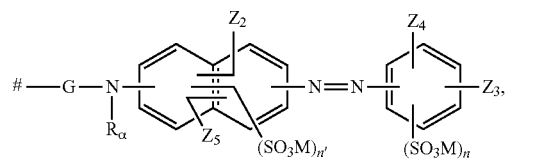 (Xa)

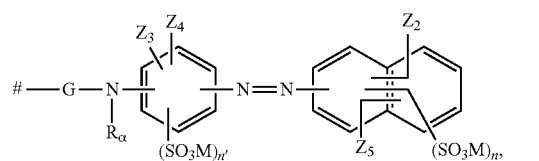 (Xb)

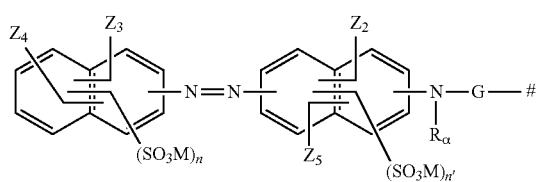 (Xc)

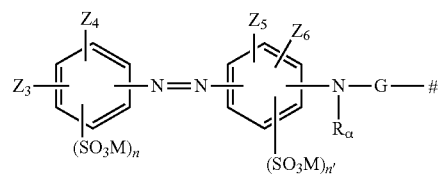 (Xd)

wherein
marks the bond to the linking group L,
$R_\alpha$ is hydrogen; linear or branched unsubstituted $C_1$-$C_4$-alkyl; linear or branched $C_1$-$C_4$-alkyl, which is substituted by at least one substituent chosen from the group consisting of hydroxyl, cyano $SO_3H$, —$NH_2$, carboxyl, carb-$C_1$-$C_4$alkoxy, $C_1$-$C_4$alkoxy, phenyl, naphthyl and pyridyl; unsubstituted aryl or aryl, which is substituted by at least one substituent chosen from the group consisting of hydroxyl, cyno, $SO_3H$, —$NH_2$, carboxyl, carb-$C_1$-$C_4$alkoxy, $C_1$-$C_4$alkoxy and $C_1$-$C_4$alkyl,
$Z_2$, $Z_3$, $Z_4$, $Z_5$ and $Z_6$ are independently from each other hydrogen; linear or branched, unsubstituted $C_1$-$C_4$alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent chosen from the group consisting of hydroxyl, Cyano, SO$_3$H, —NH$_2$, carboxyl, carb-C$_1$-C$_4$alkoxy, C$_1$-C$_4$alkyl, phenyl, naphthyl and pyridyl; halogen; OH; SO$_2$CH$_2$CH$_2$SO$_3$H; NO$_2$; COOH; COOC$_1$-C$_4$alkyl; NH$_2$; NHC$_1$-C$_4$alkyl, wherein the alkyl group may be substituted by at least one substituent chosen from the group consisting of OH, NH$_2$, C$_1$-C$_4$alkyl, CN and COOH; N(C$_1$-C$_4$alkyl)C$_1$-C$_4$alkyl, wherein the alkyl groups may independently of each other be substituted by at least one substituent chosen from the group consisting of OH, NH$_2$, C$_1$-C$_4$alkyl, CN and COOH; NH-aryl; NH-aryl, wherein the aryl is substituted by at least one substituent chosen from the group consisting of hydroxyl, cyano, SO$_3$H, —NH$_2$, carboxyl, carb-C$_1$-C$_4$alkoxy, C$_1$-C$_4$alkyl and C$_1$-C$_4$alkoxy; NHCOC$_1$-C$_4$alkyl or NHCOOC$_1$-C$_4$alkyl, G is a direct bond; COOC$_1$-C$_4$alkylene; unsubstituted arylene; arylene which is substituted by at least one substituent chosen from the group consisting of hydroxyl, cyano, NO$_2$, SO$_3$H, —NH$_2$, carboxyl, carb-C$_1$-C$_4$alkoxy, C$_1$-C$_4$alkoxy and C$_1$-C$_4$alkyl; unsubstituted C$_1$-C$_4$alkylene or C$_1$-C$_4$-alkylene which is substituted by at least one substituent chosen from the group consisting of hydroxyl, cyano, NO$_2$, SO$_3$H, —NH$_2$, carboxyl, carb-C$_1$-C$_4$alkoxy, C$_1$-C$_4$alkoxy and C$_1$-C$_4$alkyl; or —CO-arylene, n is 0; 1; 2 or 3, n' is 0; 1 or 2, and each M is independently from each other hydrogen; an alkali metal ion or an ammonium ion;

and

L is a group

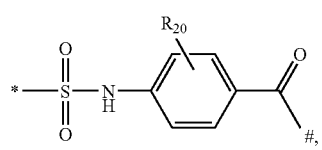

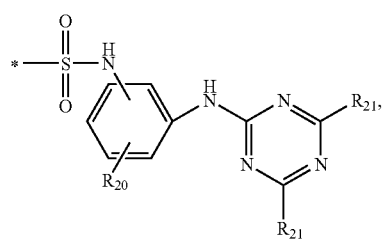

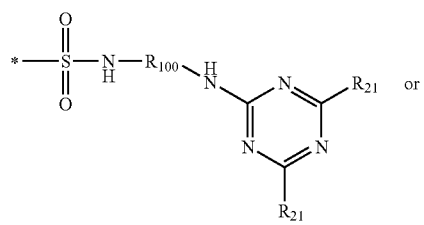

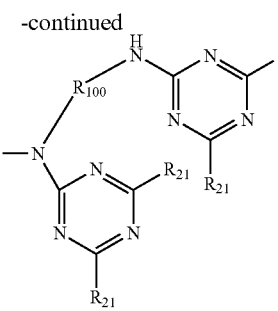

wherein
R$_{20}$ is hydrogen, C$_1$-C$_8$alkyl, C$_1$-C$_8$alkoxy or halogen;
R$_{21}$ is independently D, hydrogen, OH, Cl or F, with the proviso that at least one is D;
R$_{100}$ is C$_1$-C$_8$alkylene;
* is the point of attachment of PC; and
# is the point of attachment of the dyestuff.

2. A compound according to claim 1 of formula (1a)

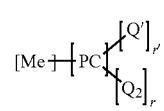

in which

PC is the phthalocyanine ring system,

Me is Zn; Ca; Mg; Na; K; Al-Z$_1$; Si(IV)-(Z$_1$)$_2$; Ti(IV)-(Z$_1$)$_2$; Ge(IV)-(Z$_1$)$_2$; Ga(III)-Z$_1$; Zr(IV)-(Z$_1$)$_2$; In(III)-Z$_1$ or Sn(IV)-(Z$_1$)$_2$

Z$_1$ is an alkanolate ion; a hydroxyl ion; R$_0$COO$^-$; ClO$_4^-$; BF$_4^-$; PF$_6^-$; R$_0$SO$_3^-$; SO$_4^{2-}$; NO$_3^-$; F$^-$; Cl$^-$; Br$^-$; I$^-$; citrate ion; tartrate ion or oxalate ion, wherein R$_0$ is hydrogen or unsubstituted C$_1$-C$_{18}$alkyl;

r is 0; 1; 2; 3 or 4;

r' is 1; 2; 3 or 4;

each Q$_2$ is independently of each other —SO$_3^-$M$^+$ or a group —(CH$_2$)$_m$—COO$^-$M$^+$; wherein M$^+$ is H$^+$, an alkali metal ion or an ammonium ion and m is 0 or a number from 1 to 12;

each Q' is independently from each other a moiety of formula -L-D wherein

D is the radical of a mono-azo dyestuff; and

L is a group

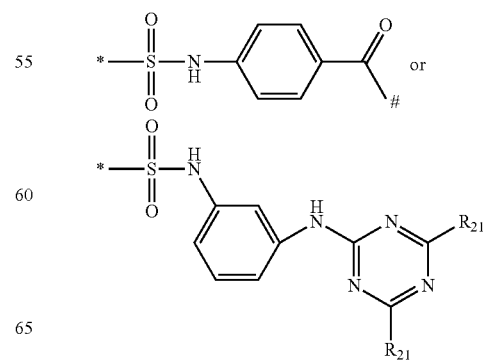

77

-continued

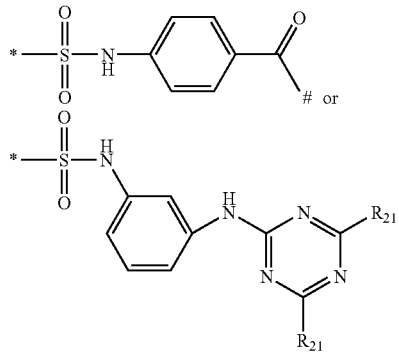

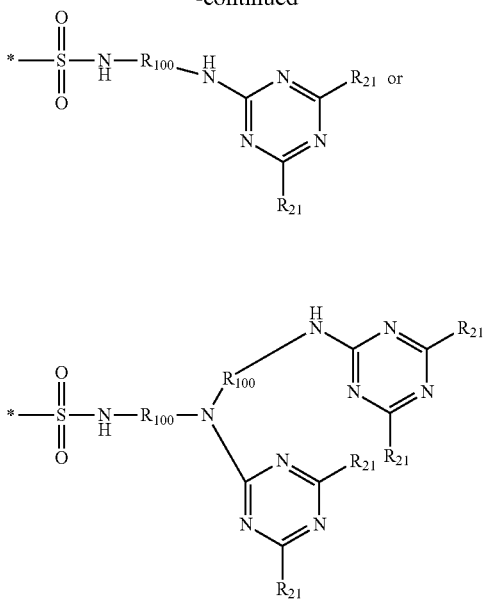

wherein
$R_{20}$ is hydrogen, $C_1$-$C_8$alkyl, $C_1$-$C_8$alkoxy or halogen;
$R_{21}$ is independently D, hydrogen, OH, Cl or F, with the proviso that at least one is D;
$R_{100}$ is $C_1$-$C_8$alkylene;
* is the point of attachment of PC; and
# is the point of attachment of the dyestuff.

3. A compound according to claim 1 of formula (2a)

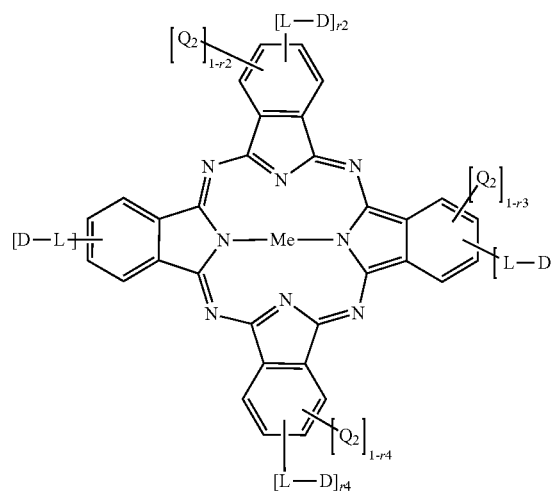

(2a)

wherein
Me is Zn, AlZ$_1$, Si(IV)-(Z$_1$)$_2$ or Ti(IV)-(Z$_1$)$_2$, wherein Z$_1$ is chloride, fluorine, bromine or hydroxyl;
each Q$_2$ is independently from each other —SO$_3^-$M$^+$ or a group —(CH$_2$)$_m$—COO$^-$M$^+$; wherein M$^+$ is H$^+$, an alkali metal ion or an ammonium ion and m is 0 or a number from 1 to 12;

78

D is the radical of a dyestuff;
L is a group

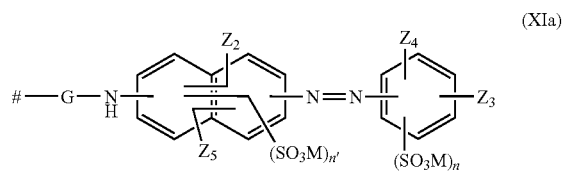

wherein
$R_{21}$ is independently D, hydrogen, OH, Cl or F with the proviso that at least one is D;
is the point of attachment of PC,
# is the point of attachment to D;
$r_2$ is 0 or 1,
$r_3$ is 0 or 1, and
$r_4$ is 0 or 1.

4. A compound according to claim 1 wherein Me is Zn.

5. A compound according to claim 1 wherein each D is independently from each other a dyestuff radical of formulae XIa, XIb, XIc or XId $$\text{(XIa)}$$

wherein
marks the bond to the bridging group L,
$Z_2$ is linear or branched, unsubstituted $C_1$-$C_2$-alkyl; linear or branched $C_1$-$C_2$-alkyl, which is substituted by at least one substituent chosen from the group consisting of hydroxyl, cyano, SO$_3$H, —NH$_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, SO$_3$H, —NH$_2$, carboxyl, carb-$C_1$-$C_2$alkoxy, $C_1$-$C_2$alkyl, phenyl, naphthyl and pyridyl or OH,
$Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, SO$_3$H, —NH$_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, SO$_3$H, —NH$_2$, carboxyl, carb-$C_1$-$C_2$alkoxy, $C_1$-$C_2$alkyl, phenyl, naphthyl and pyridyl; OH; NO$_2$; NH$_2$; NHC$_1$-$C_2$alkyl, wherein the alkyl group may be substituted by at least one substituent chosen from the group consisting of OH, $NH_2$, $C_1$-$C_2$alkyl, CN and COOH; $NHCOC_1$-$C_2$alkyl or $NHCOOC_1$-$C_2$alkyl, $Z_4$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN and COOH; $NHCOC_1$-$C_2$alkyl or $NHCOOC_1$-$C_2$alkyl, $Z_5$ is hydrogen; linear or branched, unsubstituted $C_1$-$C_2$-alkyl or linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl;, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0, 1; 2 or 3, n' is 0, 1 or 2, and each M is independently from each other hydrogen; $Na^+$ or $K^+$;

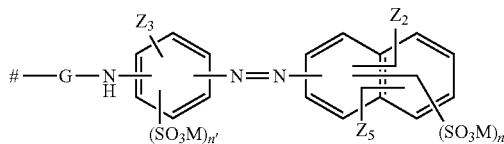

(XIb)

wherein marks the bond to the bridging group L, $Z_2$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl or OH, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN and COOH; $NHCOC_1$-$C_2$alkyl or $NHCOOC_1$-$C_2$alkyl, $Z_5$ is hydrogen; linear or branched, unsubstituted $C_1$-$C_2$-alkyl or linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl;, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0, 1; 2 or 3, n' is 0, 1 or 2, and each M is independently from each other hydrogen; $Na^+$ or $K^+$;

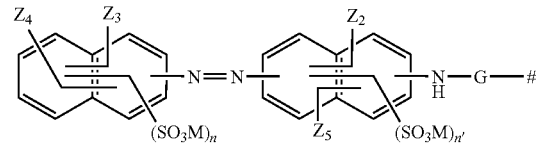

(XIc)

wherein marks the bond to the bridging group L, $Z_2$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN and COOH; $NHCOC_1$-$C_2$alkyl or $NHCOOC_1$-$C_2$alkyl, $Z_4$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN and COOH; $NHCOC_1$-$C_2$alkyl or $NHCOOC_1$-$C_2$alkyl, $Z_5$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0, 1; 2 or 3, n' is 0, 1 or 2, and each M is independently from each other hydrogen; $Na^+$ or $K^+$;

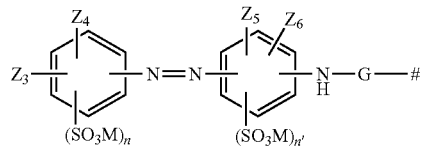

(XId)

wherein marks the bond to the bridging group L, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $SO_2CH_2CH_2SO_3H$; or $NO_2$, $Z_4$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $SO_2CH_2CH_2SO_3H$; or $NO_2$, $Z_5$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN and COOH; $NHCOC_1$-$C_2$alkyl or $NHCOOC_1$-$C_2$alkyl, $Z_6$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; or $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0, 1; 2 or 3, n' is 0, 1 or 2, and each M is independently from each other hydrogen; $Na^+$ or $K^+$.

6. A compound according to claim 1 wherein each D is independently from each other a compound of formulae 10, 11, 12, 13 or 14

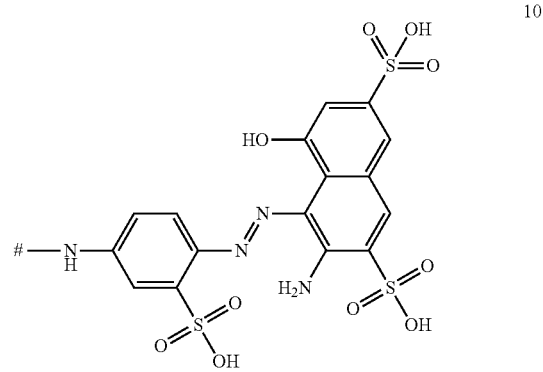

-continued

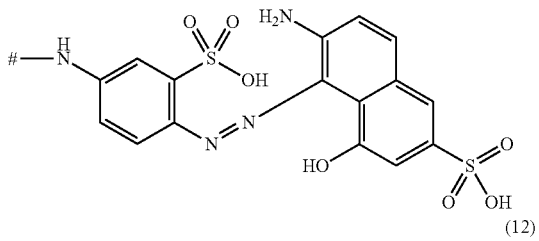

(11)

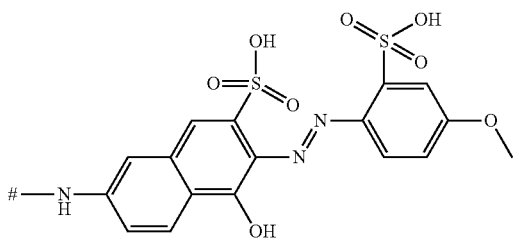

(12)

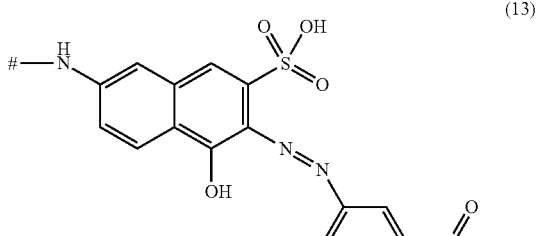

(13)

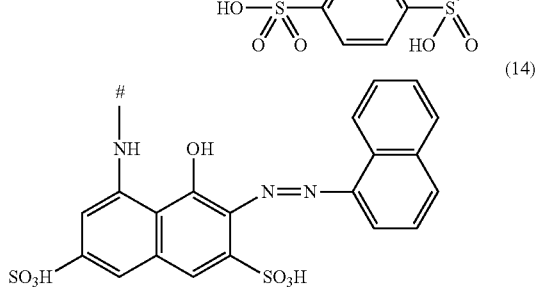

(14)

wherein # marks the bond to the bridging group L.

7. A process for producing compounds of formula (1a) according to claim 2

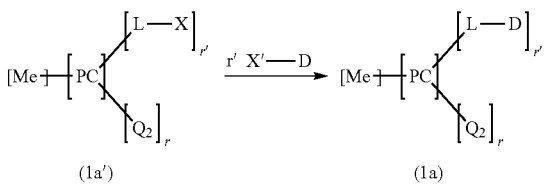

wherein X and X' are leaving groups;

Me is Zn, AlZ$_1$, Si(IV)-(Z$_1$)$_2$ or Ti(IV)-(Z$_1$)$_2$, wherein Z$_1$ is chloride, fluorine, bromine or hydroxyl;

each Q$_2$ is independently from each other —SO$_3^-$M$^+$ or a group —(CH$_2$)$_m$—COOC$^-$M$^+$; wherein M$^+$ is H$^+$, an alkali metal ion or anthe ammonium ion and m is 0 or a number from 1 to 12;

PC is the phthalocyanine ring system,

D is the radical of a dyestuff;

L is a group

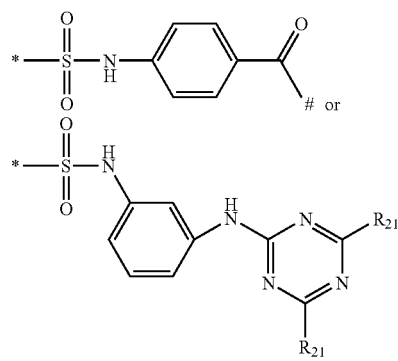

wherein

R$_{21}$ is independently D, hydrogen, OH, Cl or F with the proviso that at least one is D;

* is the point of attachment of PC, # is the point of attachment to D;

r is 0; 1; 2; 3 or 4; and r' is 1; 2; 3 or 4.

8. A shading composition in form of a granule comprising a) from 2 to 75% by weight (wt-%) of at least one phthalocyanine compound according to claim 1, based on the total weight of the granulate, b) from 10 to 95 wt-% of at least one further additive, based on the total weight of the granulate, and c) from 0 to 15 wt-% water, based on the total weight of the granulate.

9. A shading composition in liquid form comprising (a) 0.01-95 wt-% of a phthalocyanine compound of formula (1) according to claim 1, based on the total weight of the liquid formulation, (b) 5-99.99 wt-%, based on the total weight of the liquid formulation, of at least one solvent and (c) 0-10 wt-%, based on the total weight of the liquid formulation, of at least one further additive.

* * * * *